United States Patent [19]

Koishi et al.

[11] Patent Number: 4,999,003

[45] Date of Patent: Mar. 12, 1991

[54] APPARATUS FOR STEERING FRONT AND REAR WHEELS OF A MOTOR VEHICLE

[75] Inventors: Masaru Koishi; Tomoyuki Yonezawa; Hiroshi Enomoto; Kazushiro Inoue, all of Saitama, Japan

[73] Assignee: Honda Giken Kogyo Kabushiki Kaisha, Tokyo, Japan

[21] Appl. No.: 233,217

[22] Filed: Aug. 17, 1988

[30] Foreign Application Priority Data

Aug. 18, 1987 [JP] Japan .................. 62-204698
Sep. 4, 1987 [JP] Japan .................. 62-221297
Sep. 4, 1987 [JP] Japan .................. 62-221298
Mar. 18, 1988 [JP] Japan .................. 63-66657
Mar. 18, 1988 [JP] Japan .................. 63-66658

[51] Int. Cl.$^5$ .......................................... B60K 17/358
[52] U.S. Cl. .................................. 280/103; 180/236
[58] Field of Search .............. 280/91, 98, 99, 100, 280/103; 180/234, 236, 237, 219, 210

[56] References Cited

U.S. PATENT DOCUMENTS 1,170,270 10/1914 Johnston .
4,582,334 4/1986 Tishiro et al. ................. 280/91
4,586,722 5/1986 Watanabe et al. .............. 280/103
4,600,074 7/1986 Watanabe et al. .............. 180/251

FOREIGN PATENT DOCUMENTS 61-295174 12/1986 Japan .

*Primary Examiner*—Charles A. Marmor
*Assistant Examiner*—Richard Camby
*Attorney, Agent, or Firm*—Irving M. Weiner; Joseph P. Carrier; Pamela S. Burt

[57] ABSTRACT

A front and rear wheel steering apparatus in a motor vehicle includes a front wheel steering mechanism and a rear wheel steering mechanism which are operatively coupled to front wheels and rear wheels rotatably supported on a vehicle frame for transmitting turning movement of a steering handlebar to the front and rear wheels. While the steering handlebar is being turned from a neutral position to a prescribed angle in one direction, the rear wheels are steered in the same direction as the front wheels, and while the steering handlebar is being turned from the prescribed angle to a maximum angle, the rear wheels are steered in the opposite direction to the front wheels. The front wheel steering angle reaches a maximum value when the steering handlebar is turned to the prescribed angle, and substantially remains at the maximum value even when the steering handlebar is further turned beyond the prescribed angle. The motor vehicle also has a rear swing arm vertically swingably mounted on the vehicle frame and supporting the rear wheels. A junction between a most downstream component of the rear wheel steering mechanism which is coupled to the vehicle frame and a most upstream component thereof which is coupled to the rear swing arm is positioned on a swing axis of the rear swing arm.

13 Claims, 17 Drawing Sheets

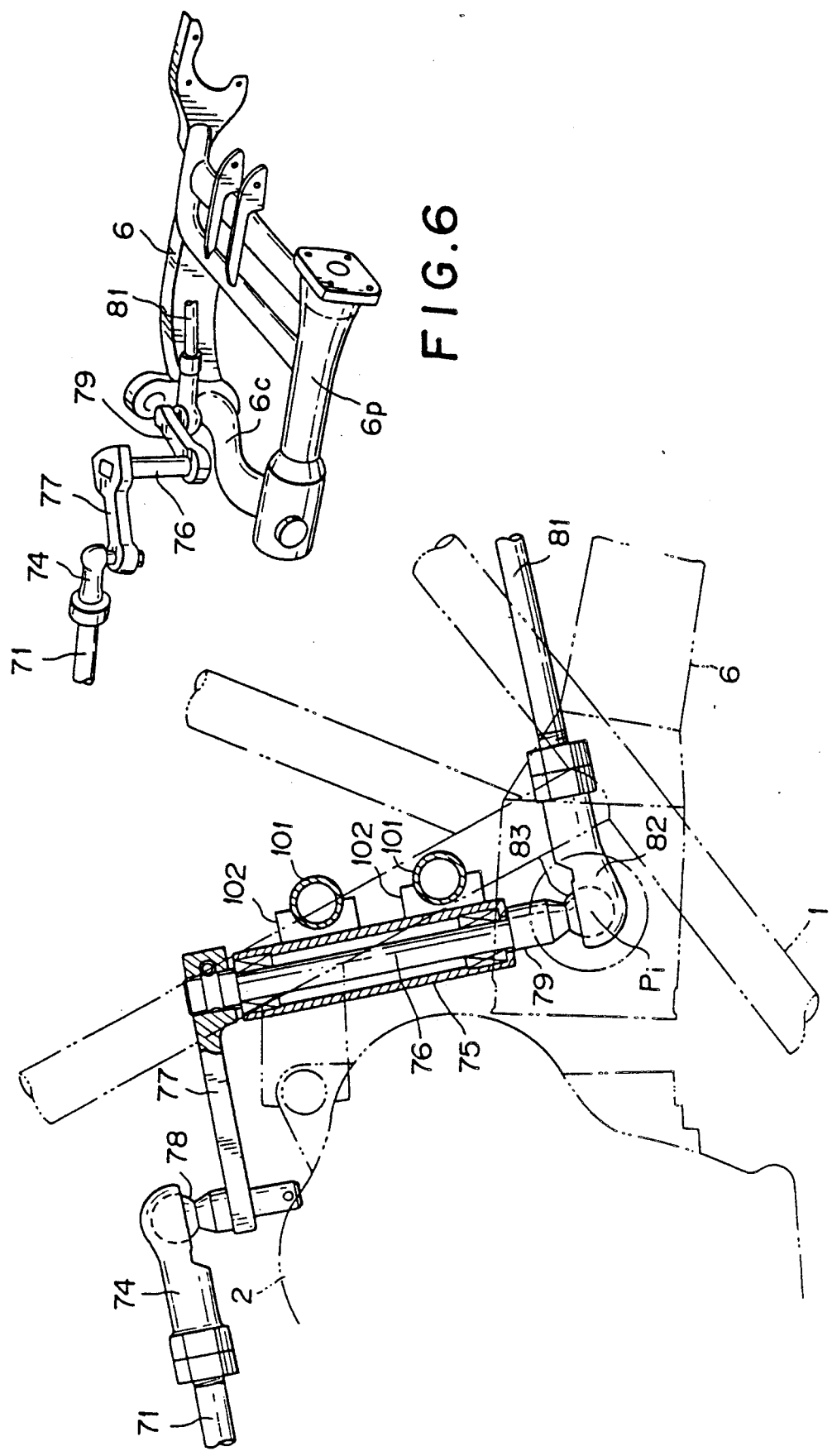

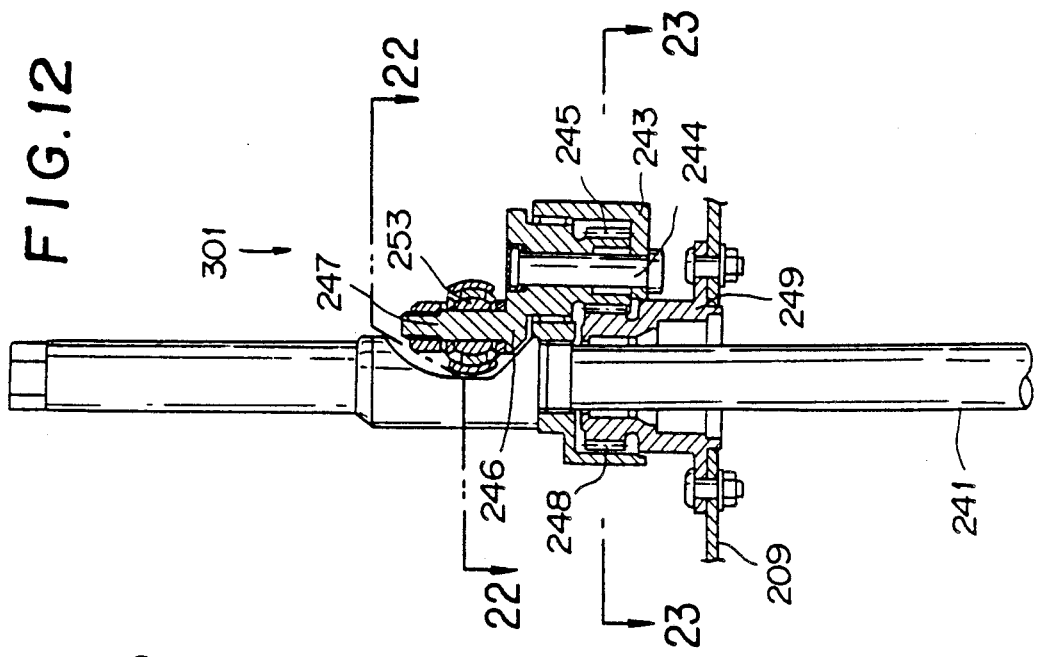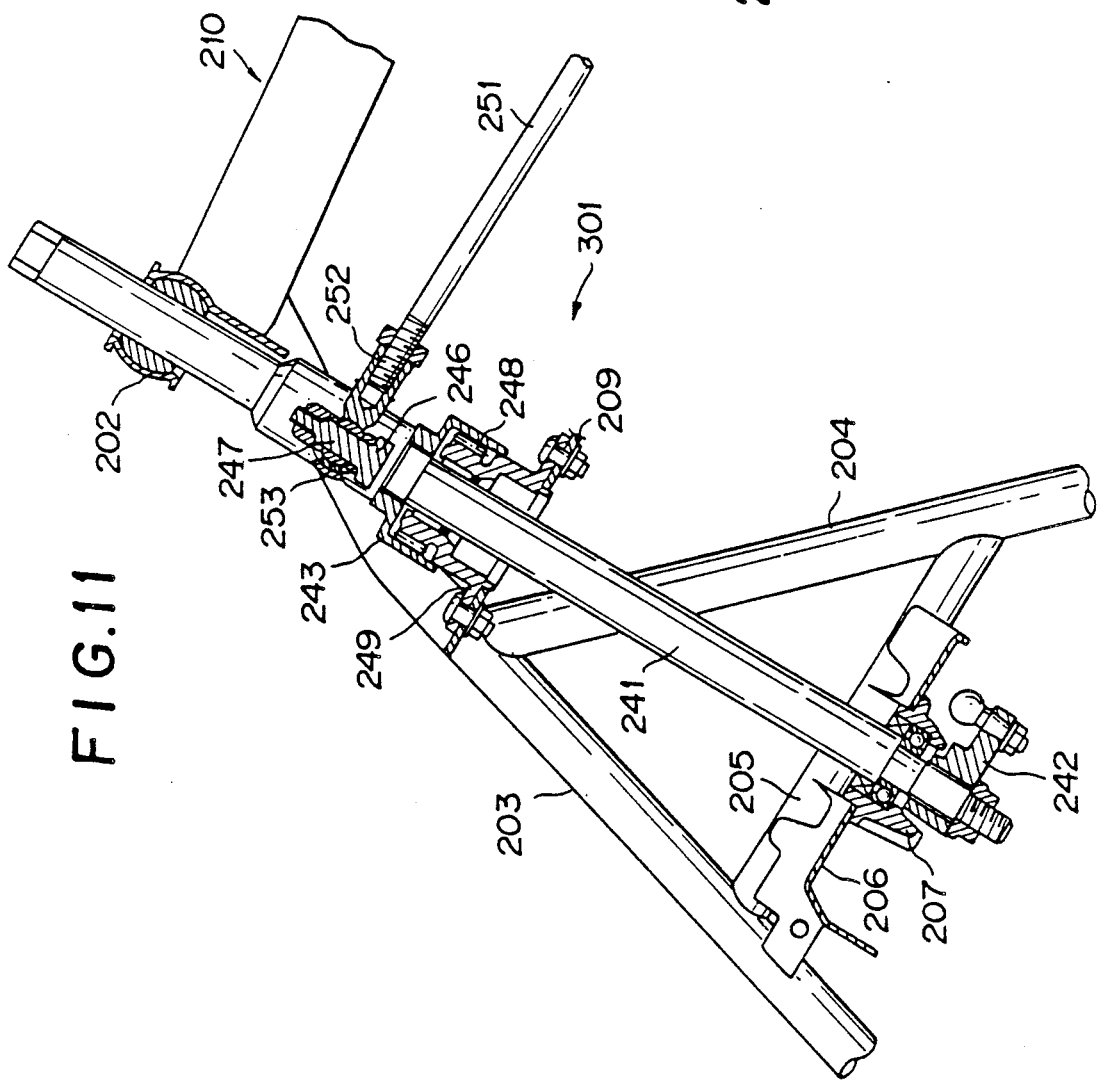

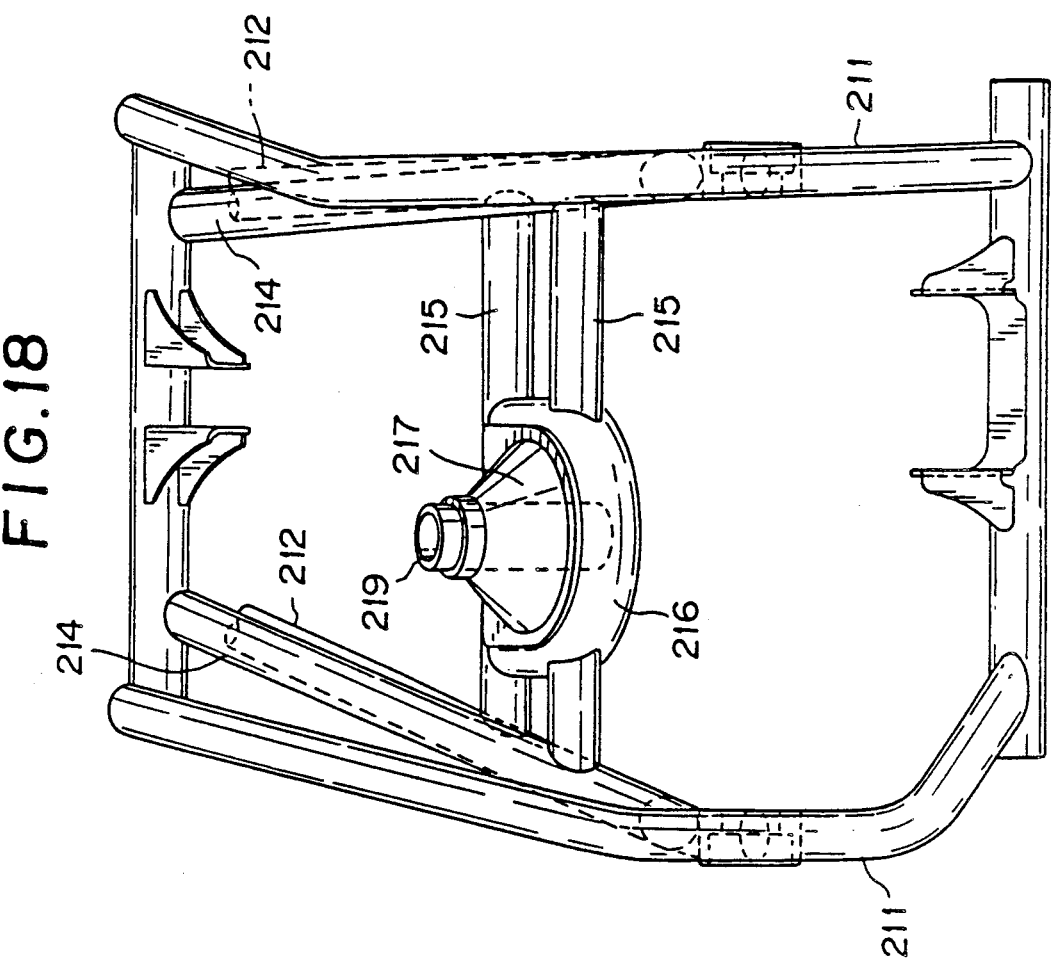
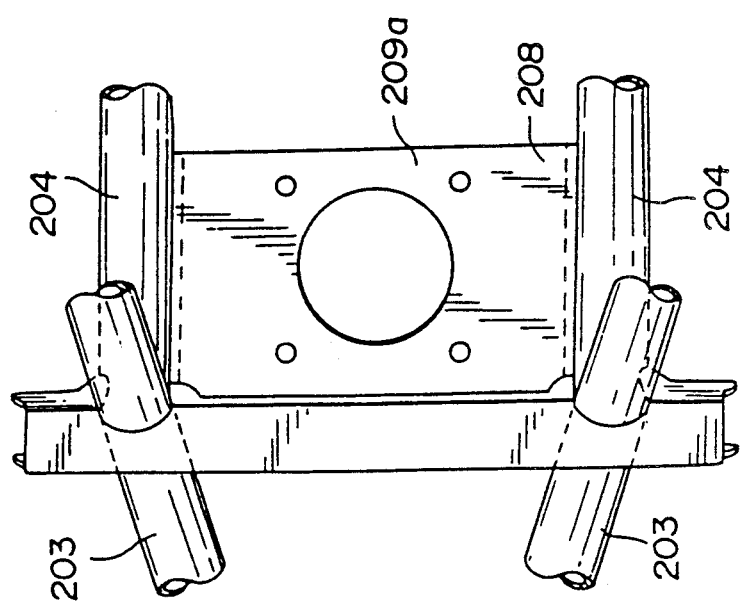

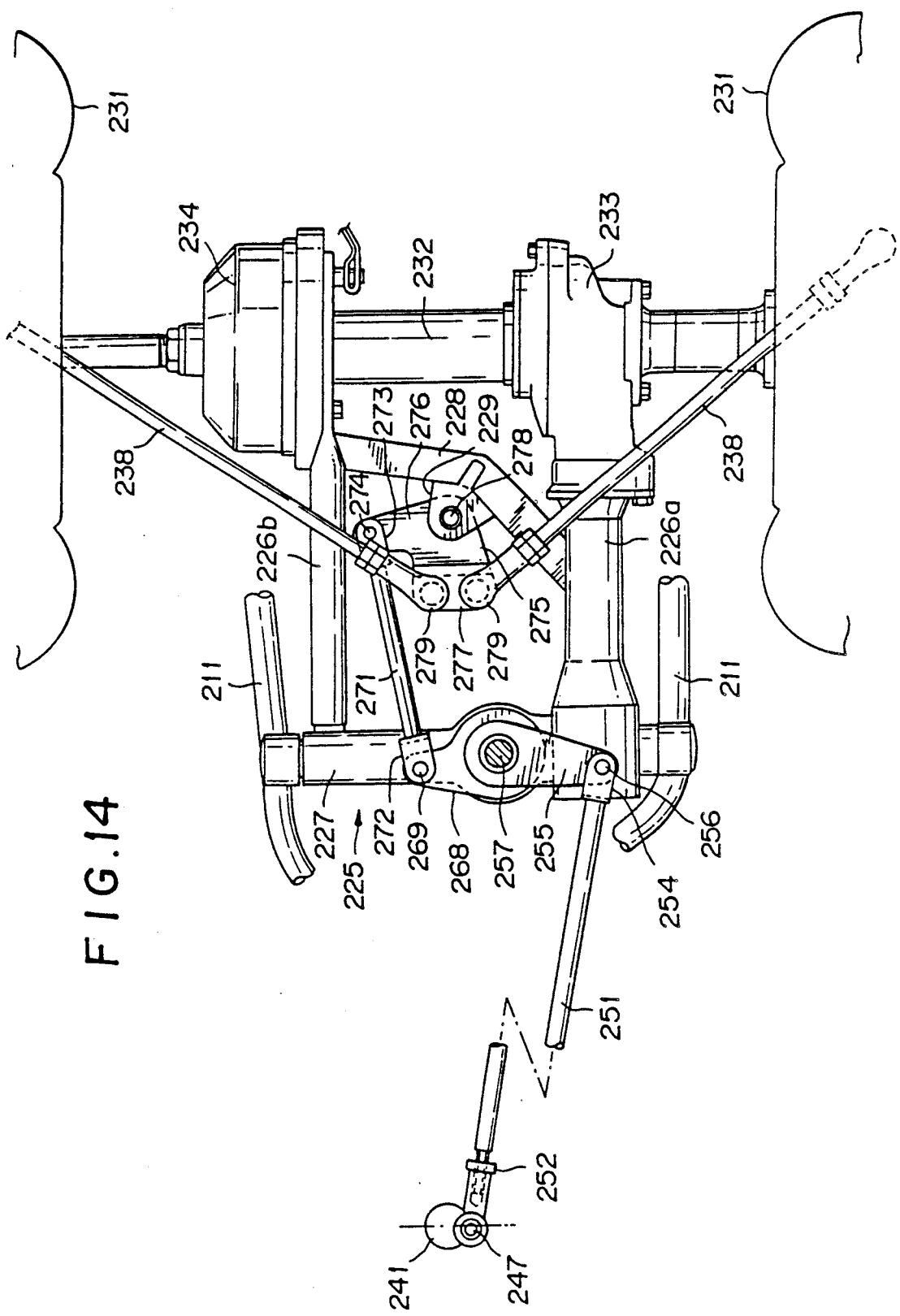

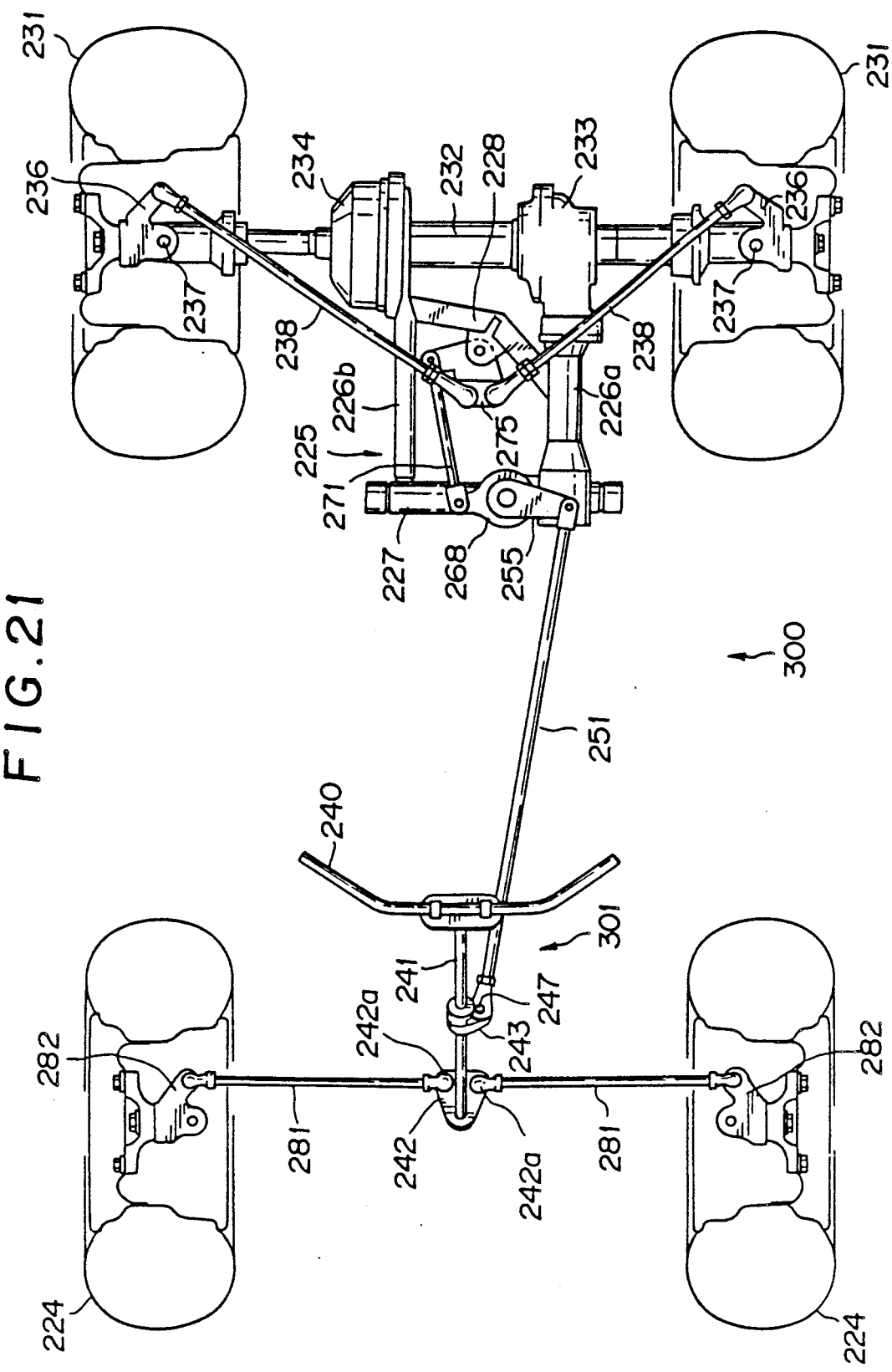

APPARATUS FOR STEERING FRONT AND REAR WHEELS OF A MOTOR VEHICLE

BACKGROUND OF THE INVENTION

1. Field of the Invention:

The present invention relates to an apparatus for steering the front and rear wheels of a motor vehicle, and more particularly to an apparatus for steering the front and rear wheels of a straddle-type off-road motor vehicle having wide tires on front and rear wheels.

2. Description of the Relevant Art:

As disclosed in Japanese Laid-Open Patent Publications Nos. 61-232966 (published Oct. 17, 1986) and 61-295174 (published Dec. 25, 1986), there is known an apparatus for steering the front and rear wheels of a straddle-type off-road motor vehicle with wide tires on the front and rear wheels for travelling over rough terrain. The disclosed steering apparatus comprises front and rear wheel steering devices for transmitting steering action of a steering handlebar to the front and rear wheels to steer these wheels. In the steering apparatus disclosed in the former publication, the front wheels are steered in proportion to the turning motion of the steering handlebar, and the rear wheels are progressively steered in the opposite direction to the direction of steering movement of the front wheels. In the steering apparatus disclosed in the latter publication, the front wheels are steered in proportion to the turning motion of the steering handlebar, and the rear wheels are not steered while the steering angle of the steering handlebar is in a relatively small range, but are progressively steered in the opposite direction to the front wheels while the steering angle of the steering handlebar is in a relatively large range.

Since the steering angles of the front and rear wheels are increased as the steering handlebar is turned to a greater extent in both of the disclosed steering apparatus, the steering load applied to the steering handlebar is increased as the turning motion of the steering handlebar is increased. Particularly, the steering load on the steering handlebar becomes maximum when the rear wheels are steered to a maximum angle. More specifically, in the front and rear wheel steering apparatus, inasmuch as the rear wheel steering angle is progressively increased with respect to the steering angle of the steering handlebar, the steering load which the driver applies to the steering handlebar is progressively increased in the vicinity of an angular range where the steering handlebar angle is of a maximum value. In other words, the steering load required for the driver to turn the steering handlebar from a neutral position to a steering limit position (=maximum steering angle position) is smoothly increased at first, but not immediately prior to the steering limit position. Therefore, the conventional front and rear wheel steering apparatus have a tendency for the driver to fail to get a smooth steering feeling at all times during operation of the motor vehicle.

SUMMARY OF THE INVENTION

It is an object of the present invention to provide an apparatus for steering the front and rear wheels of a motor vehicle, which apparatus has at least a steering wheel angle range in which the rear wheels are steerable in a direction opposite to the direction in which the front wheels are steered, is capable of reducing a steering load required when the steering angle of the rear wheels is maximum, and allows the steering load to be smoothly increased at all times for giving the driver a smooth steering feeling particularly while the steering wheel is being turned from a neutral position to a limit steering position.

To achieve the above object, there is provided in accordance with the present invention in a front and rear wheel steering apparatus in a motor vehicle having a vehicle frame, at least one front wheel and rear wheels rotatably supported on the vehicle frame, a steering handle operatively mounted on the vehicle frame, a straddle-type seat mounted on the vehicle frame, a rear swing arm vertically swingably mounted on the vehicle frame and supporting the rear wheels; a front wheel steering mechanism operatively interconnecting the steering handle and the front wheel for transmitting turning movement of the steering handle to the front wheel; and a rear wheel steering mechanism operatively interconnecting the steering handle and the rear wheels for transmitting turning movement of the steering handle to the rear wheels, the improvement wherein the front wheel steering mechanism comprises a front wheel steering angle generating mechanism responsive to turning movement in one direction of the steering handle from a neutral position through a prescribed angle to a maximum angle for generating a front wheel steering angle which increases from zero to a maximum value in the one direction as an angle of turning movement of the steering handle increases; and the rear wheel steering mechanism comprises a rear wheel steering angle generating mechanism responsive to turning movement in the one direction of the steering handle from the neutral position to the prescribed angle for generating a rear wheel steering angle in the one direction, and also responsive to turning movement of the steering handle from the prescribed angle to the maximum angle for generating a rear wheel steering angle in a direction opposite to the one direction.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a side elevational view, partly in cross section, of a steering force transmitting path of a rear wheel steering mechanism around the engine of the motor vehicle of FIG. 1;

FIG. 6 is a fragmentary perspective view, as viewed from behind, of the rear wheel steering mechanism in the front and rear wheel steering apparatus;

FIGS. 11 and 12 are sectional side and front elevational views of a planetary gear mechanism serving as an input unit for applying steering force from a steering shaft in the steering apparatus shown in FIG. 10;

FIG. 13 is a plan view of a member for fixing a sun gear of the planetary gear mechanism shown in FIG. 11;

FIGS. 14 and 15 are respectively a plan view and a perspective view, as viewed from behind, of a rear steering mechanism in the front and rear wheel steering apparatus of the second embodiment, the views also showing a rear wheel suspension mechanism;

FIG. 18 is a perspective view, as viewed from behind, of a support member for an upper central shaft of the constant-velocity joint;

FIG. 21 is a plan view of the front and rear wheel steering apparatus of the second embodiment;

DETAILED DESCRIPTION OF THE PREFERRED EMBODIMENTS

Figure 1:
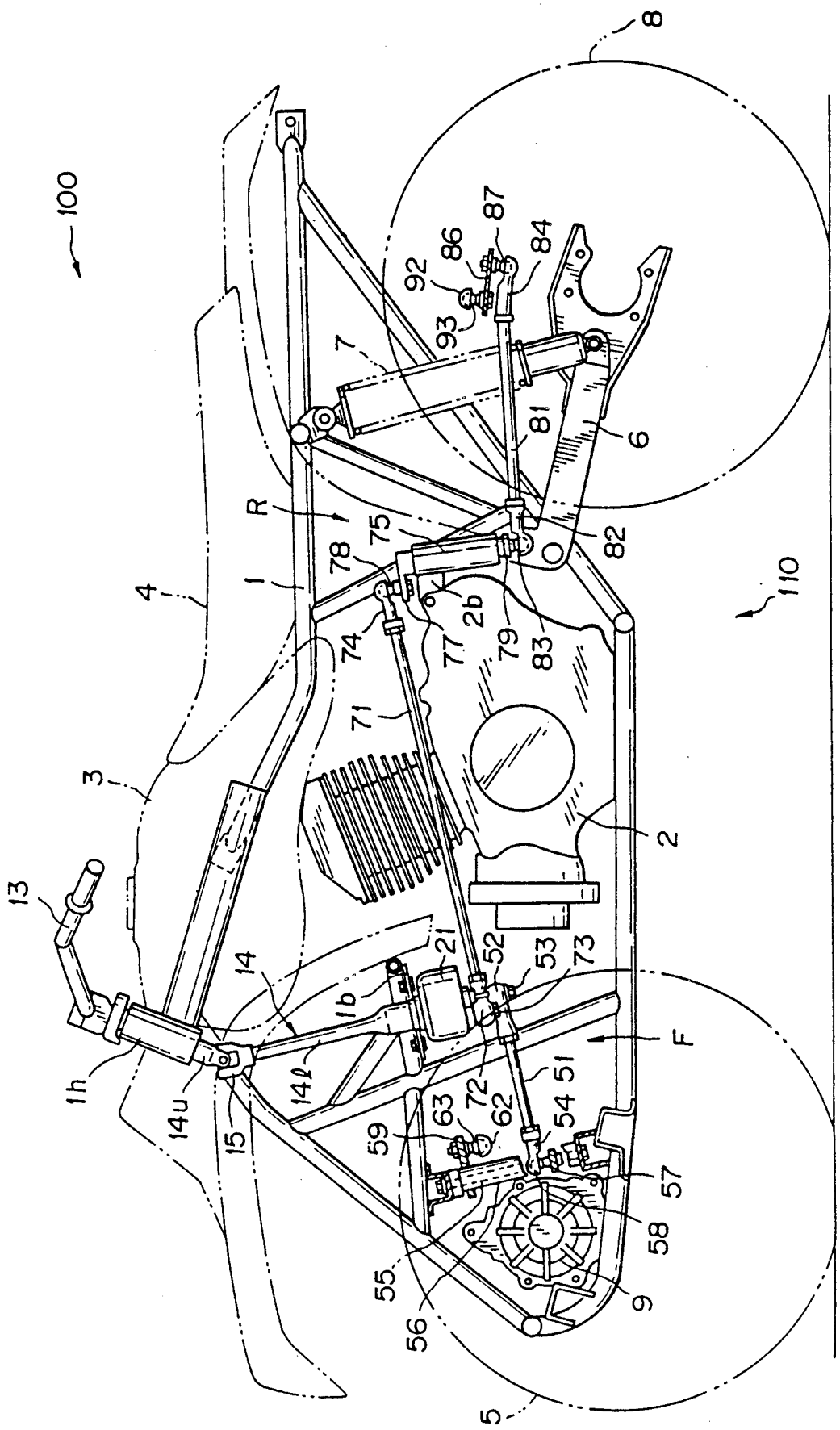
FIG. 1 is a schematic side elevational view of a straddle-type four-wheel motor vehicle having a front and rear wheel steering apparatus according to a first embodiment of the present invention.
Figure 2:
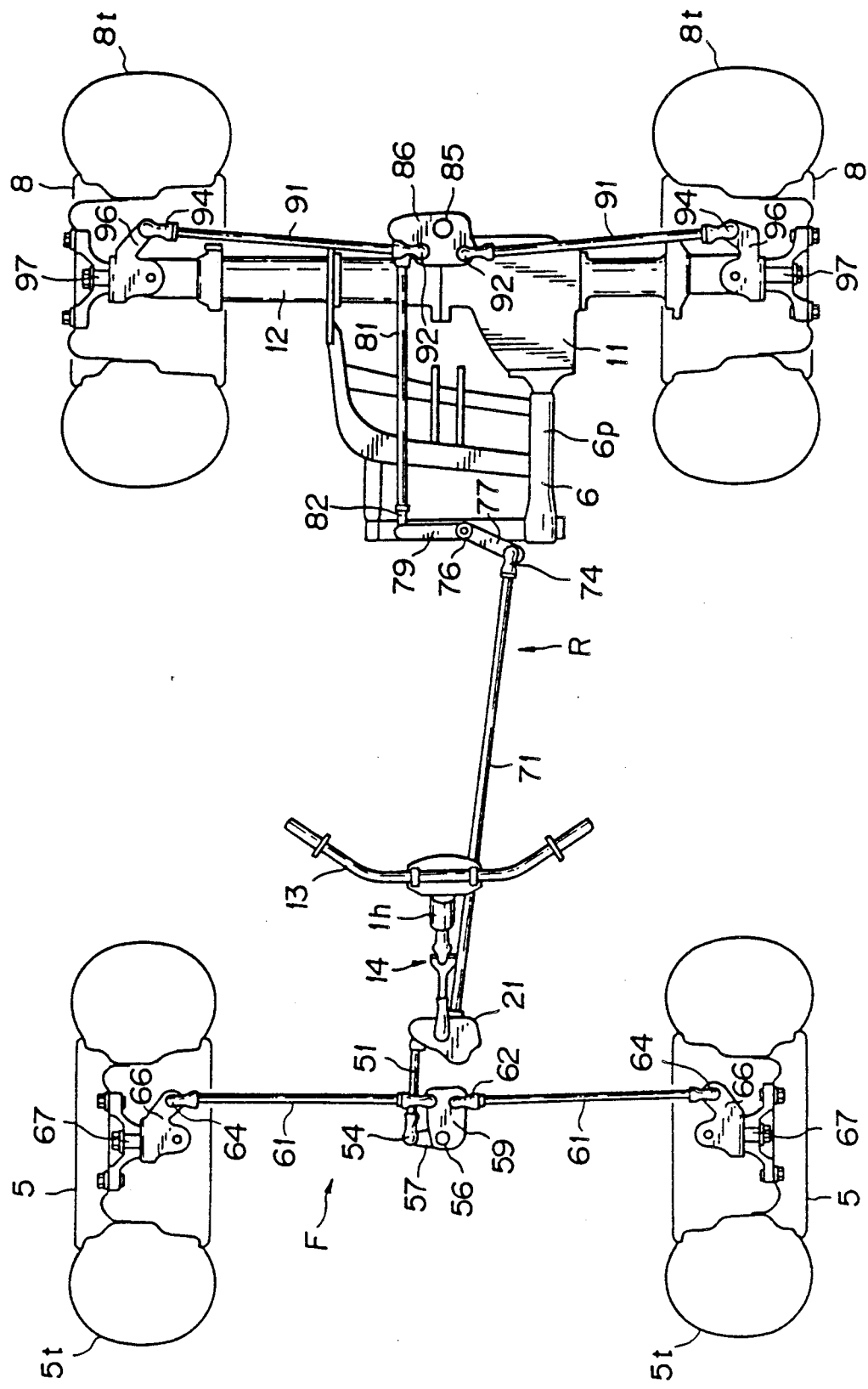
FIG. 2 is a plan view of the motor vehicle shown in FIG. 1.

As shown in FIGS. 1 and 2, a straddle-type four-wheel motor vehicle 100 incorporates therein a front and rear wheel steering apparatus 110 according to a first embodiment of the present invention. The motor vehicle 100 has a vehicle frame 1 with an engine 2 mounted centrally therein. The vehicle frame 1 includes a head pipe 1h on its upper front end, and supports a fuel tank 3 and a straddle-type or saddle seat 4 behind the head pipe 1h. A pair of laterally spaced front wheels 5 is supported on a front portion of the vehicle frame 1 by respective front wheel suspensions, not shown. A pair of laterally spaced rear wheels 8 is vertically swingably supported on a rear portion of the vehicle frame 1 by a swing arm 6, with a damper 7 being coupled between the swing arm 6 and the vehicle frame 1. As illustrated in FIG. 2, wide ultra-low-pressure balloon tires 5t, 8t are mounted respectively on the front and rear wheels 5, 8. The engine 2 transmits drive power through a drive power transmission mechanism (not shown) to a front differential box 9 for the front wheels 5 and a rear differential box 11 for the rear wheels 8. The rear differential box 11 serves as a left-hand member of the swing arm 6 and is coupled to a pipe 6p in which a propeller shaft (not shown) is inserted. The rear differential box 11 has an axle tube 12 extending laterally therethrough.

A handlebar 13 is fixed to the upper end of a steering shaft assembly 14 angularly movably extending through the head pipe 1h, the steering shaft assembly 14 comprising an upper shaft 14u and a lower shaft 14l. The upper shaft 14u is inserted in the head pipe 1h. The upper and lower shafts 14u, 14l are operatively coupled to each other by a universal joint 15 disposed below the head pipe 1h.

In FIGS. 1 through 7 which will be described below, various parts are shown as being in conditions and/or positions when the handlebar 13 is in its neutral position.

Figure 3:
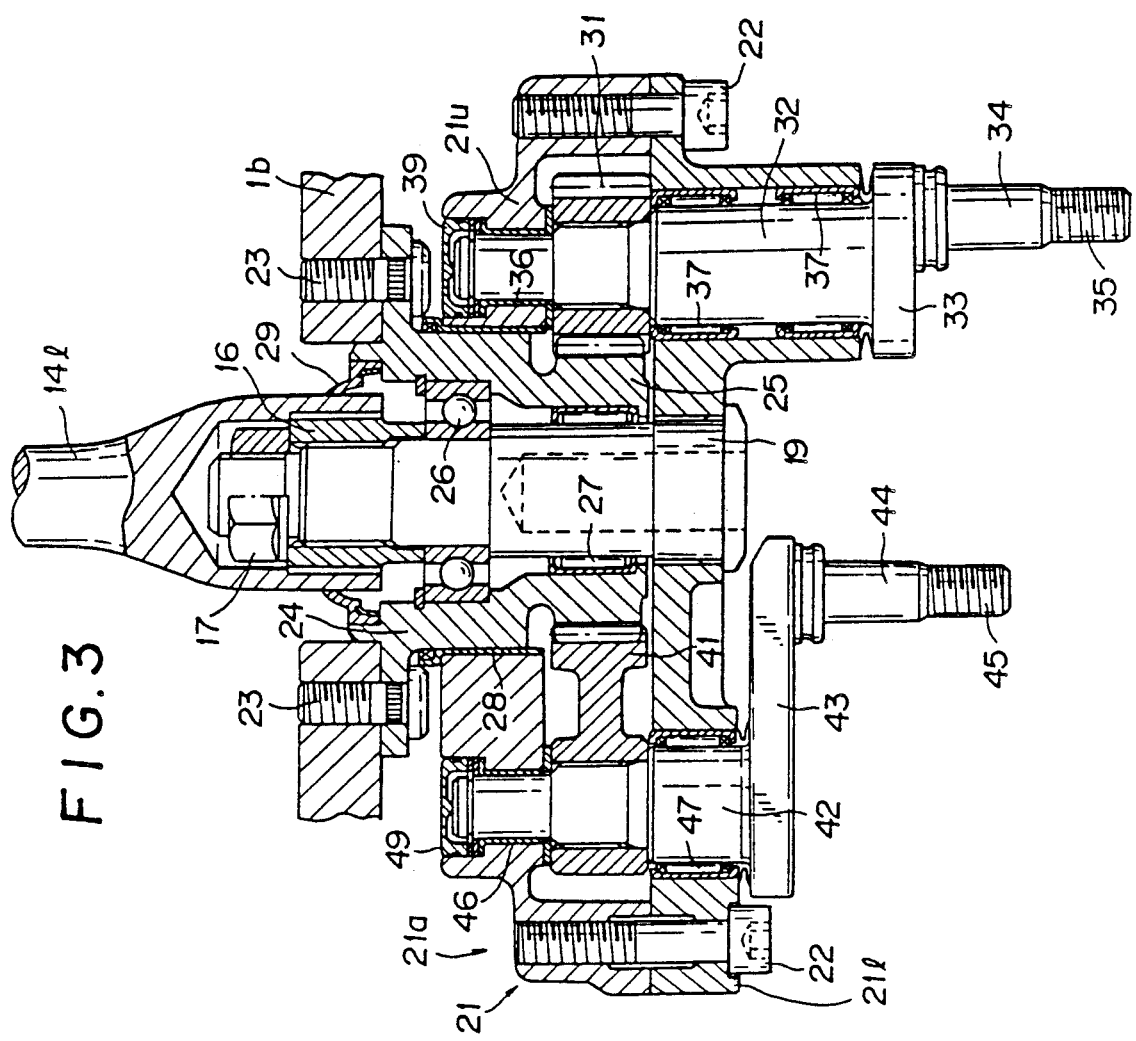
FIG. 3 is a sectional side elevational view of a planetary gear mechanism serving as an input unit for applying steering force from a steering shaft to the front and rear wheel steering apparatus.

As shown in FIG. 3, an input shaft 19 of a steering angle generating mechanism 21 is fixed to the lower end of the lower shaft 14l of the steering shaft assembly 14. More specifically, the lower shaft 14l has a recess defined in its lower end, and a collar 16 is fitted in the recess through splines. The input shaft 19 is fitted through splines in the collar 16 and has an upper end fixed to the collar 16 by means of a bolt 17. The input shaft 19 has a lower end in which there is fitted through splines a lower case 21l that is connected to an upper case 21u by means of bolts 22. The upper and lower cases 21u, 21l jointly constitute a laterally wide gear case assembly 21a which houses a sun gear 25 centrally therein in concentric relation to the input shaft 19.

The sun gear 25 comprises a fixed gear formed on the lower end of a tubular member 24 which is fixed by bolts 23 to a bracket 1b that is affixed to the vehicle frame 1. The input shaft 19 has a ball bearing 26 and a needle bearing 27, and is concentrically and rotatably disposed in the tubular member 24. A bushing 28 is interposed between the inner peripheral surface of the upper case 21u and the outer peripheral surface of the tubular member 24. To the upper end of the tubular member 24, there is attached a dust boot 29 sealingly covering the lower end of the lower shaft 14l of the steering shaft assembly 14.

In response to turning motion of the steering shaft assembly 14, the gear case assembly 21a and the input shaft 19 are therefore angularly movable with the steering shaft assembly 14 about the stationary sun gear 25 secured to the vehicle frame.

Figure 4:
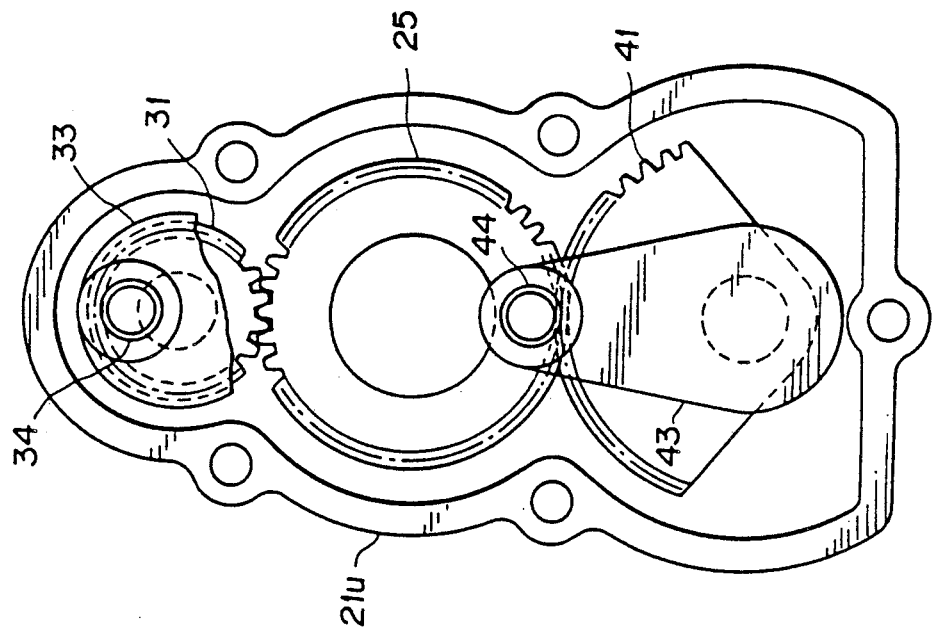
FIG. 4 is a bottom view of the planetary gear mechanism illustrated in FIG. 3.

As shown in FIG. 4, a pair of front and rear wheel planet gears 31, 41 are disposed in the gear case assembly 21a in mesh with the sun gear 25 on opposite sides thereof When the handlebar 13 is in its neutral position, the front and rear wheel planet gears 31, 41 are positioned on right-hand and left-hand sides, respectively, of the sun gear 25. The planet gears 31, 41 comprise a smaller-diameter pinion gear and a larger-diameter sector gear, respectively, which are fitted through splines over shafts 32, 42 rotatably mounted in the gear case assembly 21a. The shaft 32 is rotatably mounted in the gear case assembly 21a by means of a bushing 36 and needle bearings 37, whereas the shaft 42 is rotatably mounted in the gear case assembly 21a by means of a bushing 46 and a needle bearing 47. Caps 39, 49 are mounted on the outer ends of the bushings 36, 46, respectively.

The shafts 32, 42 have lower ends projecting downwardly from the gear case assembly 21a and having respective arms 33, 43. The arms 33, 43 have respective pins 34, 44 projecting downwardly therefrom at eccentric positions offset or displaced from the central axes of the shafts 32, 42. The distance between the rear wheel shaft 42 and the pin 44 is larger than the distance between the front wheel shaft 32 and the pin 34. The pins 34, 44 have externally threaded surfaces 35, 45 on their lower ends, respectively.

The gear case assembly 21a and the sun gear 25 and the planet gears 31, 41 which are disposed in the gear case assembly 21a jointly constitute a planet gear mechanism which serves as the steering angle generating mechanism 21 for the front and rear wheels The eccentric pins 34, 44 serve as output members of the steering angle generating mechanism 21.

As shown in FIGS. 1 and 2, the rear end 52 of a front link rod 51 is angularly movably fitted over the lower end of the front wheel eccentric pin 34, the front link rod 51 extending in a fore-and-aft direction of the motor vehicle and being adjustable in length. The rear end 52 of the front link rod 51 is fastened to the eccentric pin 34 by a nut 53 threaded over the externally threaded surface 35 of the pin 34. The front end 72 of an elongate intermediate link rod 71 is angularly movably fitted over the lower end of the rear wheel eccentric pin 44, the intermediate link rod 71 being inclined slightly leftwardly (FIG. 2) in the rearward direction and adjustable in length. The front end 72 of the link 71 is fastened to the eccentric pin 44 by means of a nut 73 threaded over the externally threaded surface 45 of the pin 44.

A shaft 55 is vertically fixed to the front portion of the vehicle frame 1, with a pipe 56 being angularly movably fitted in the shaft 55. A plate 59 of a substantially rectangular shape in plan is fixed at its front portion to an upper portion of the pipe 56, and a lever 57 extending to the right is secured to a lower portion of the pipe 56. The front link rod 51 has a front end 54 pivotally coupled to the right-hand end of the lever 57 through a ball-and-socket joint 58.

The plate 59 has a rear end to which there are pivotally coupled inner ends 62 of a pair of laterally spaced front tie rods 61 through ball-and-socket joints 63, the front tie rods 61 being symmetrically positioned transversely of the motor vehicle and adjustable in length. The front tie rods 61 have respective outer ends 64 pivotally coupled to respective knuckle arms 66 through ball-and-socket joints (not shown). Axles 67 of the front wheels 6 are rotatably supported on the knuckle arms 66, respectively.

The members 14, 21, 34, 51, 57, 56, 59, 61, 66 ranging from the steering shaft 14 to the knuckles 66 jointly constitute a front wheel steering mechanism F.

As shown in FIGS. 1 and 5, the intermediate link rod 71 is positioned leftwardly of the engine 2 and has a rear end 74 pivotally connected to one end of a lever 77 through a ball-and-socket joint 78. The lever 77 is fixed to the upper end of a shaft 76 angularly movably fitted in a pipe 75 which is disposed substantially vertically. The pipe 75 is secured to brackets 102 mounted on front portions of upper and lower cross pipes 101 installed on the vehicle frame 1 behind the engine 2. The shaft 76 has a lower end projecting downwardly of the pipe 75. To the lower end of the shaft 76, there is fixed the left-hand end of a lever 79 which extends transversely of the motor vehicle when the handlebar 13 is in the neutral position A rear link rod 81 has a front end 82 pivotally coupled to the right-hand end of the lever 79 through a ball-and-socket joint 83, the rear link rod 81 being oriented in the fore-and-aft direction of the motor vehicle and adjustable in length.

An upwardly extending shaft (not shown) is mounted on the rear differential box 11, with a pipe 85 being angularly movably fitted in the shaft. A plate 86 of a substantially rectangular shape in plan is fixed to the pipe 85. The rear link rod 81 has a rear end 84 pivotally coupled to the lower surface of a right-hand side portion of the plate 86 through a ball-and-socket joint 87. Inner ends 92 of rear tie rods 91 are pivotally coupled to the upper surface of a front portion of the plate 86 at laterally symmetrical positions thereon by means of ball-and-socket joints 93 in front of the ball-and-socket joint 87, the rear tie rods 91 extending substantially transversely of the motor vehicle and being adjustable in length. The rear tie rods 91 have outer ends 94 pivotally coupled to respective knuckle arms 96 on which axles 97 of the rear wheels 8 are rotatably supported.

The members 14, 21, 71, 77, 86, 79, 81, 86, 91, 96 ranging from the steering shaft 14 to the knuckles 96 jointly constitute a rear wheel steering mechanism R.

The front wheel steering mechanism F and the rear wheel steering mechanism R make up the front and rear wheel steering apparatus 110.

As shown in FIG. 6, a cross member 6c extending between front ends of the swing arm 6 which supports the rear wheels 8 has a downwardly curved portion, and the ball-and-socket joint 83 by which the lever 79 is pivotally coupled to the front end of the rear link rod 81 is disposed above the downwardly bent portion of the cross member 6c. As illustrated in FIG. 5, the ball-and-socket joint 83 has a center which is initially positioned on a pivot axis Pi (i.e., swing axis Pi) about which the swing arm 6 can swing with respect to the vehicle frame 1. Therefore, the members of the rear wheel steering mechanism R, including the rear link rod 81 and the members 86, 91 positioned rearwardly of the rear link rod 81, are vertically swung with the swing arm 6 about the pivot axis Pi as the rear wheels 8 are vertically swung with respect to the vehicle frame 1.

Figure 7:
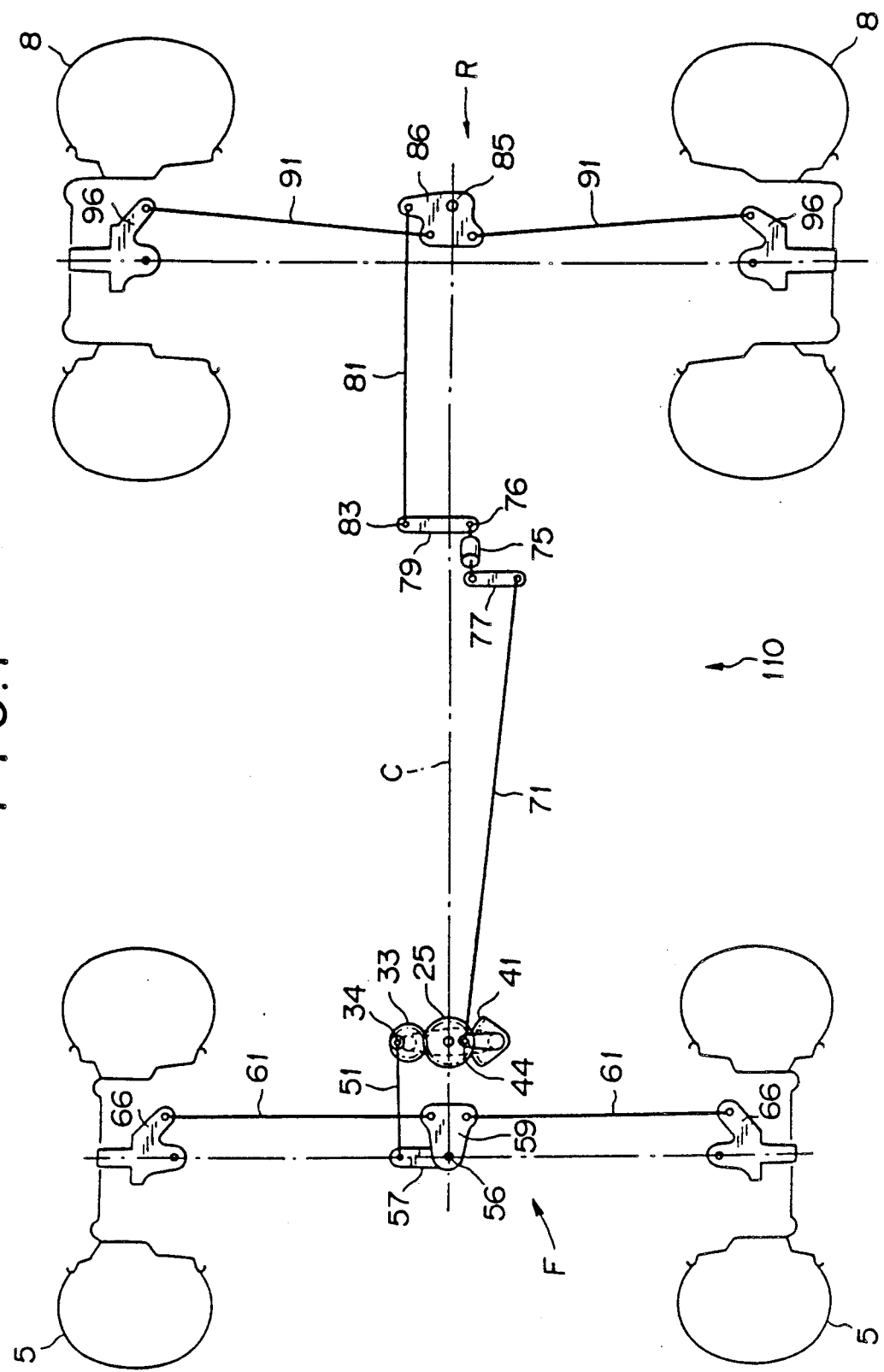
FIG. 7 is a schematic plan view of the front and rear wheel steering apparatus of the first embodiment.

As shown in FIG. 7, the steering shaft 14, the input shaft 19 of the steering angle generating mechanism 21, the pipe 56 about which the front plate 59 is angularly movable, and the pipe 85 about which the rear plate 86 is angularly movable are all initially positioned on a longitudinal central axis C of the motor vehicle. The planet gears 31, 41 of the steering angle generating mechanism 21 are initially positioned such that a hypothetical line interconnecting the centers of the planet gears 31, 41 extends perpendicularly to the central axis C. The eccentric pin 34 and the lever 57 of the front wheel steering mechanism F are positioned on the right-hand side of the central axis C. The shaft 76 interposed between the link rods 71, 81 is positioned on the left-hand side of the central axis C behind the engine 2. The levers 77, 79 are disposed on the left-hand and right-hand sides, respectively, of the shaft 76. The eccentric pin 44 of the rear wheel steering mechanism R is located leftwardly of the central axis C.

The front link rod 51 and the rear link rod 81 are disposed parallel to and rightwardly of the central axis C, and the intermediate link rod 71 is disposed on the left-hand side of the central axis C and inclined slightly leftwardly in the rearward direction.

Operation of the front and rear wheel steering apparatus 110 will be described with reference to FIGS. 8 and 9.

The handlebar 13 can be turned through a practical maximum angle of about 50° in each of clockwise and counterclockwise directions.

It is assumed here that the handlebar 13 is turned counterclockwise from the neutral position. The directions in which the various components are rotated or moved are defined when the vehicle is viewed in plan as shown in FIG. 8.

Figure 8:
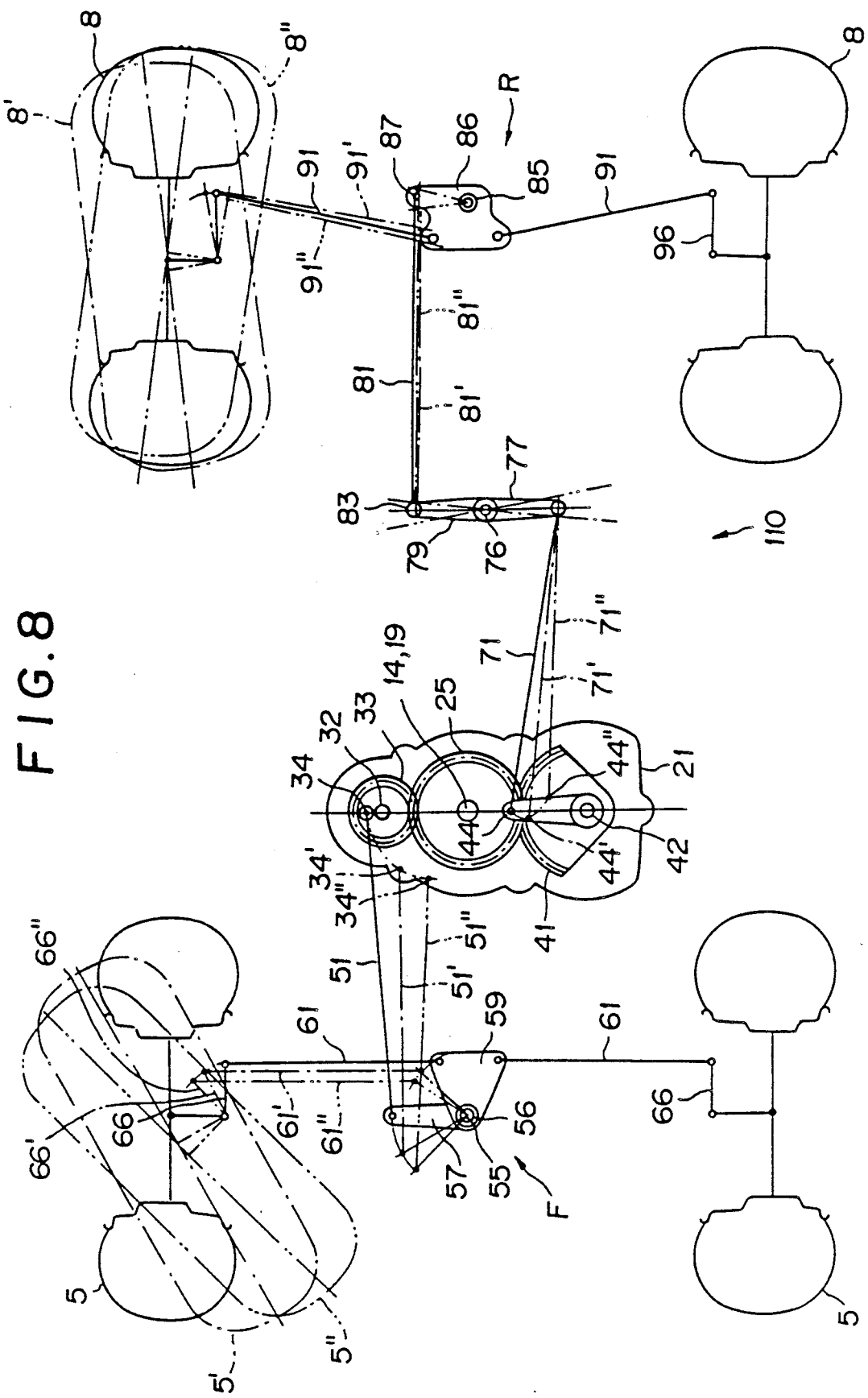
FIG. 8 is a schematic plan view of the front and rear wheel steering apparatus of the first embodiment, with a steering force transmitting path including the planetary gear mechanism being shown at an enlarged scale.

As the handlebar 13 is turned, the gear case assembly 21a of the steering angle generating mechanism 21 coupled to the steering shaft 14 is angularly moved counterclockwise about its center (i.e., the input shaft 19) in FIG. 8. Rotation of the gear case assembly 21a causes the planet gears 31, 41 to revolve counterclockwise around the sun gear 25 while in mesh with the stationary sun gear 25. Upon such revolution, the planet gears 31, 41 rotate counterclockwise about their own shafts 32, 42. Such counterclockwise rotation of the planet gears 31, 41 about their own axes causes the eccentric pins 34, 44 to rotate counterclockwise about the shafts 32, 42, respectively.

The eccentric pin 34 which serves as one output member of the steering angle generating mechanism 21 effects cycloidal movement which is a combination of counterclockwise arcuate movement of the moving point 32 about the stationary point 19, the moving point 32 being spaced from the stationary point 19 by a certain distance (19-32), and counterclockwise arcuate movement of the moving point 34 about the moving stationary point 32, the moving point 34 being spaced from the moving stationary point 32 by a certain distance (32-34). The eccentric pin 44 which serves as the other output member of the steering angle generating mechanism 21 effects cycloidal movement which is a combination of counterclockwise arcuate movement of the moving point 42 about the stationary point 19, the moving point 42 being spaced from the stationary point 19 by a certain distance (19-42), and counterclockwise arcuate movement of the moving point 44 about the moving stationary point 42, the moving point 44 being spaced from the moving stationary point 42 by a certain distance (42-44).

Therefore, as the handlebar 13 is turned from the neutral position all the way through a left-hand maximum angle $\theta$hmax, the pin 34 moves through a point 34' finally to a point 34'', and the pin 44 moves through a point 44' finally to a point 44''. The handlebar 13 is turned through an angle $\theta$h when the pins 34, 44 are at the respective points 34', 44', and the angle $\theta$h of turning movement of the handlebar 13 when the pins 34, 44 reach the respective points 34'', 44'' is the maximum angle $\theta$hmax referred to above. When the pins 34, 44 reach the points 34', 44', the other related components reach positions indicated by the dot-and-dash lines and their corresponding reference numerals with a prime ('), and when the pins 34, 44 reach the points 34'', 44'', the other related components reach positions indicated by the two-dot-and-dash lines and their corresponding reference numerals with a double prime (''). For the sake of brevity, only the right-hand wheels are shown as being steered in FIG. 8.

More specifically, as the handlebar 13 is progressively turned from the neutral position through the maximum angle $\theta$hmax, the distance between the points 19, 34 in the longitudinal direction of the motor vehicle is increased substantially linearly from zero in the forward direction, and is finally maintained at an almost constant level. As a result, as the angle $\theta$h of turning movement of the handlebar 13 increases, the front wheel steering angle $\theta$f varies as indicated by a characteristic curve Lf shown in FIG. 9. The front wheels 5 are steered to the left at all times when the handlebar 13 is turned counterclockwise. As the handlebar 13 is turned from the neutral position through the maximum angle $\theta$hmax, the distance between the points 19, 44 in the longitudinal direction of the motor vehicle is first progressively increased from zero in the forward direction to a certain value, thereafter progressively reduced back to zero, and then progressively increased again in the rearward direction. As a result, as the angle $\theta$h of turning movement of the handlebar 13 increases, the rear wheel steering angle $\theta$r varies as indicated by a characteristic curve Lr in FIG. 9. While the handlebar 13 is turned in a smaller range range, the rear wheels are steered to the left, and while the handlebar 13 is turned in a larger angle range, the rear wheels 8 are steered to the right. Stated otherwise, the gear ratios between the sun gear 25 and the planet gears 33, 43, and the amounts of eccentricity of the eccentric pins 34, 44 are selected to obtain the front and rear wheel steering characteristic curves Lf, Lr as shown in FIG. 9.

Figure 9:
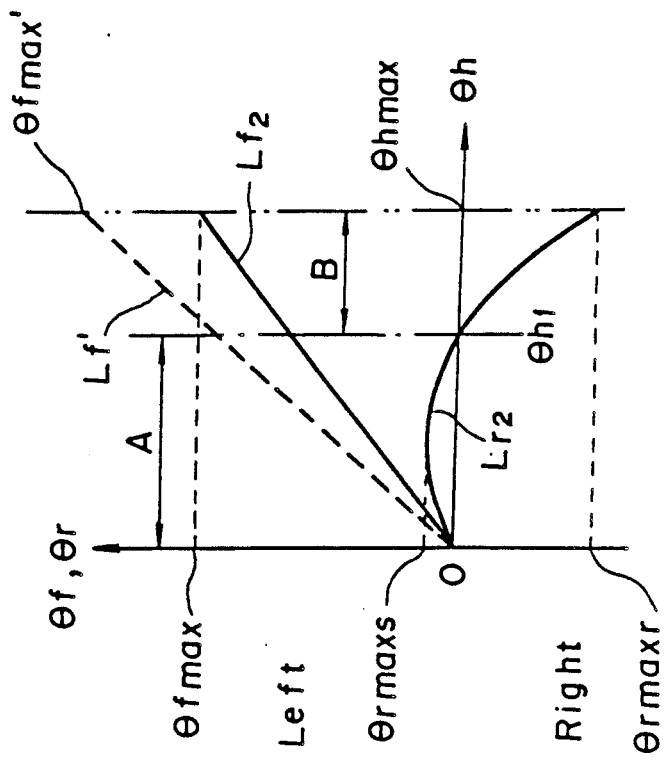
FIG. 9 is a graph showing steering characteristics of the front and rear wheels which are steered by the front and rear wheel steering apparatus of the first embodiment.

Consequently, the front and rear wheels 5, 8 are steered in the same direction in a range A, and in the opposite directions in a range B as shown in FIG. 9. In the range A, the absolute value of the maximum angle $\theta$rmaxs of the rear wheel steering angle $\theta$r is relatively small, and in the range B, the absolute value of the maximum angle $\theta$rmaxr of the rear wheel steering angle $\theta$r is relatively large. When the handlebar 13 is turned clockwise, it is apparent that there are obtained characteristic curves which are in symmetric relationship to the characteristic curves Lf, Lr with respect to the origin of the graph of FIG. 9. Therefore, the steering operation when the handlebar 13 is turned clockwise will not be described.

As described above, in the conventional front and rear wheel steering apparatus, the front wheel steering angle $\theta$f is linearly varied as indicated by a characteristic line Lf' when the angle $\theta$h of turning movement of the handlebar enters the range B, and reaches a maximum value $\theta$hmax' when the handlebar turning angle $\theta$h reaches its maximum value $\theta$hmax. When the handlebar turning angle $\theta$h reaches its maximum value $\theta$hmax, the rear wheel steering angle $\theta$r also reaches its maximum value $\theta$rmaxr.

In the front and rear wheel steering apparatus 110 of the present invention, when the handlebar turning angle $\theta$h reaches a boundary value $\theta$h1 between the ranges A, B, the front wheel steering angle $\theta$f substantially reaches its maximum angle $\theta$fmax. The front wheel steering angle $\theta$f is substantially kept at this maximum steering angle $\theta$fmax in the range B in which the absolute value of the rear wheel steering angle $\theta$r is relatively large. With the present invention, therefore, at the time the handlebar turning angle $\theta$h reaches the maximum value $\theta$hmax, the maximum front wheel steering angle $\theta$fmax is smaller than the conventional maximum front wheel steering angle $\theta$fmax' by ($\theta$fmax' − $\theta$fmax). As a consequence, the steering load required to be applied to the handlebar 13 by the driver, which becomes maximum when the handlebar turning angle $\theta$h reaches its maximum $\theta$hmax is reduced by the difference ($\theta$fmax' − $\theta$fmax), and hence the handlebar 13 can be turned more easily. In the range A, the front wheel steering angle $\theta f$ is linearly increased, and the rear wheel steering angle $\theta r$ is not varied to a large extent. In the range B, the front wheel steering angle $\theta f$ is not varied substantially, and the rear wheel steering angle $\theta r$ is increased substantially in proportion to the handlebar turning angle $\theta h$. Consequently, while the handlebar 13 is being turned from the neutral position to the limit steering position ($\theta h = \theta hmax$), the steering load required is smoothly increased to give the driver a smooth steering feeling.

In the rear wheel steering mechanism R of the front and rear wheel steering apparatus 110, when the swing arm 6 vertically swings as the rear wheels 8 are vertically moved, the members 86, 91 connected to the swing arm 6 are also vertically swung substantially with the swing arm 6 about the pivot axis Pi. However, the pivot point 83 between the components coupled to the vehicle frame 1 and the components coupled to the swing arm 6 is initially positioned on the pivot axis Pi (i.e., the swing axis Pi) of the swing arm 6. Therefore, even when the swing arm 6 vertically swings, the geometry of the components 86, 91 coupled to the swing arm 6 is not significantly affected by the vertical swinging movement of the swing arm 6. As a result, any effect which the vertical swinging movement of the rear wheels 8 has on the intended steering characteristic curve Lr (FIG. 9) of the rear wheels 8 is minimized.

In the front and rear wheel steering apparatus 110, moreover, the steering angle generating mechanism 21 is constructed of the planetary gear mechanism having the stationary sun gear 25 and the two planet gears 31, 41 meshing with the sun gear 25, and the arms 33, 44 connected to the respective planet gears 31, 41 and having the eccentric pins 34, 44, respectively. Consequently, the steering characteristic curves Lf, Lr of the front and rear wheels, which are independent from each other as shown in FIG. 9, can easily be achieved by the simple arrangement. The steering characteristic curves of the front and rear wheels can appropriately be varied by suitably varying the gear ratios between the sun gear 25 and the planet gears 31, 41 and the distances by which the eccentric pins 34, 44 are eccentrically displaced. The steering characteristics of the front and rear wheels can thus be selected with greater freedom. For example, if the sun gear 25 remains the same shape but the radii of the planet gears 33, 43 are increased, then the rates of change of the front wheel steering angle $\theta f$ and the rear wheel steering angle $\theta r$ are made smaller than the characteristic curves Lr, Lf shown in FIG. 9. This reduces the width or interval of the range B. Conversely, if the sun gear 25 remains the same shape but the radii of the planet gears 33, 43 are reduced, then the rates of change of the front wheel steering angle $\theta f$ and the rear wheel steering angle $\theta r$ are made larger than the characteristic curves Lf, Lr shown in FIG. 9. This increases the width or interval of the range B.

A front and rear wheel steering apparatus 300 according to a second embodiment of the present invention will be described below with reference to FIGS. 10 through 24.

Figure 10:
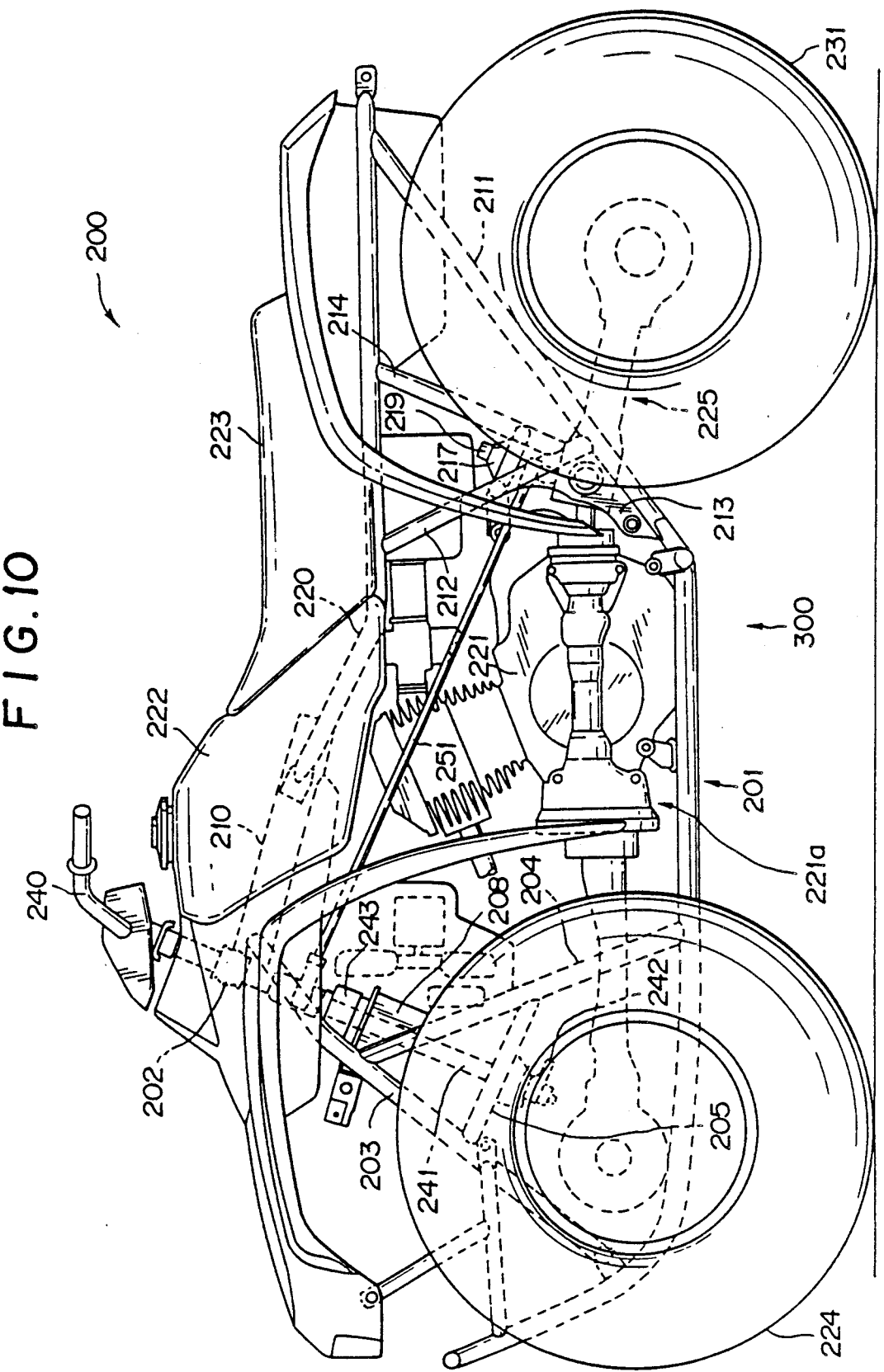
FIG. 10 is a schematic side elevational view of a straddle-type four-wheel motor vehicle incorporating a front and rear wheel steering apparatus according to a second embodiment of the present invention.
Figure 15:
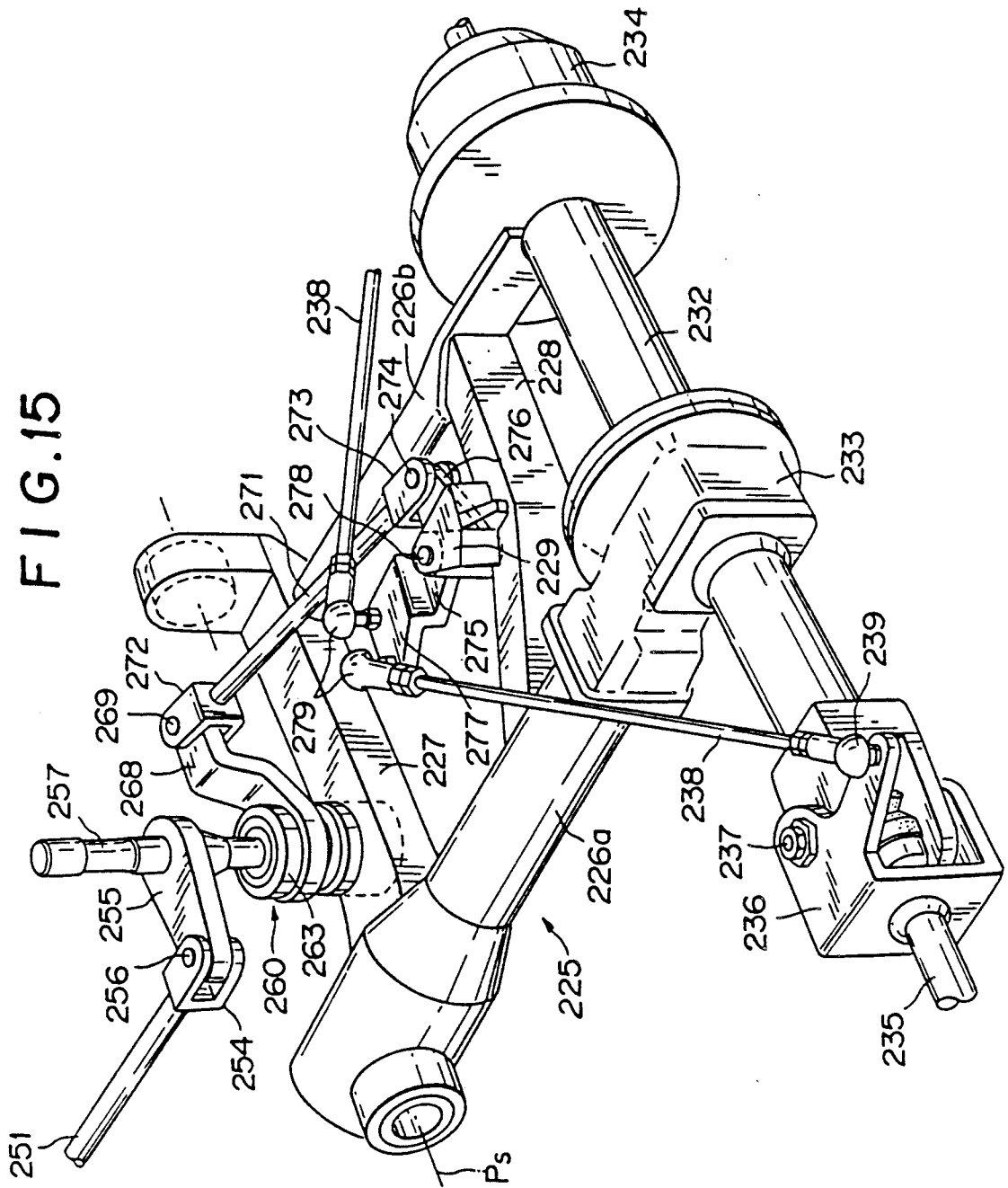

As shown in FIG. 10, a straddle-type four-wheel motor vehicle 200 incorporates therein a front and rear wheel steering apparatus 300 according to a second embodiment of the present invention. The motor vehicle 200 has a piping vehicle frame 201 with an engine 221 mounted centrally therein. The vehicle frame supports a fuel tank 222 and a straddle seat or saddle 223 behind a head pipe 202 mounted on an upper front end of the vehicle frame 201. A pair of laterally spaced front wheels 224 is supported on a front portion of the vehicle frame 201 by respective front wheel suspensions (described later on). A pair of laterally spaced rear wheels 231 is vertically swingably supported on a rear portion of the vehicle frame 201 by a swing arm 225, with a damper being coupled between the swing arm 225 and the vehicle frame 201. Wide ultra-low-pressure balloon tires are mounted respectively on the front and rear wheels 224, 231. Drive power from the engine 221 is transmitted through a drive power transmission mechanism 221a to the front and rear wheels 224, 231.

Figure 20:
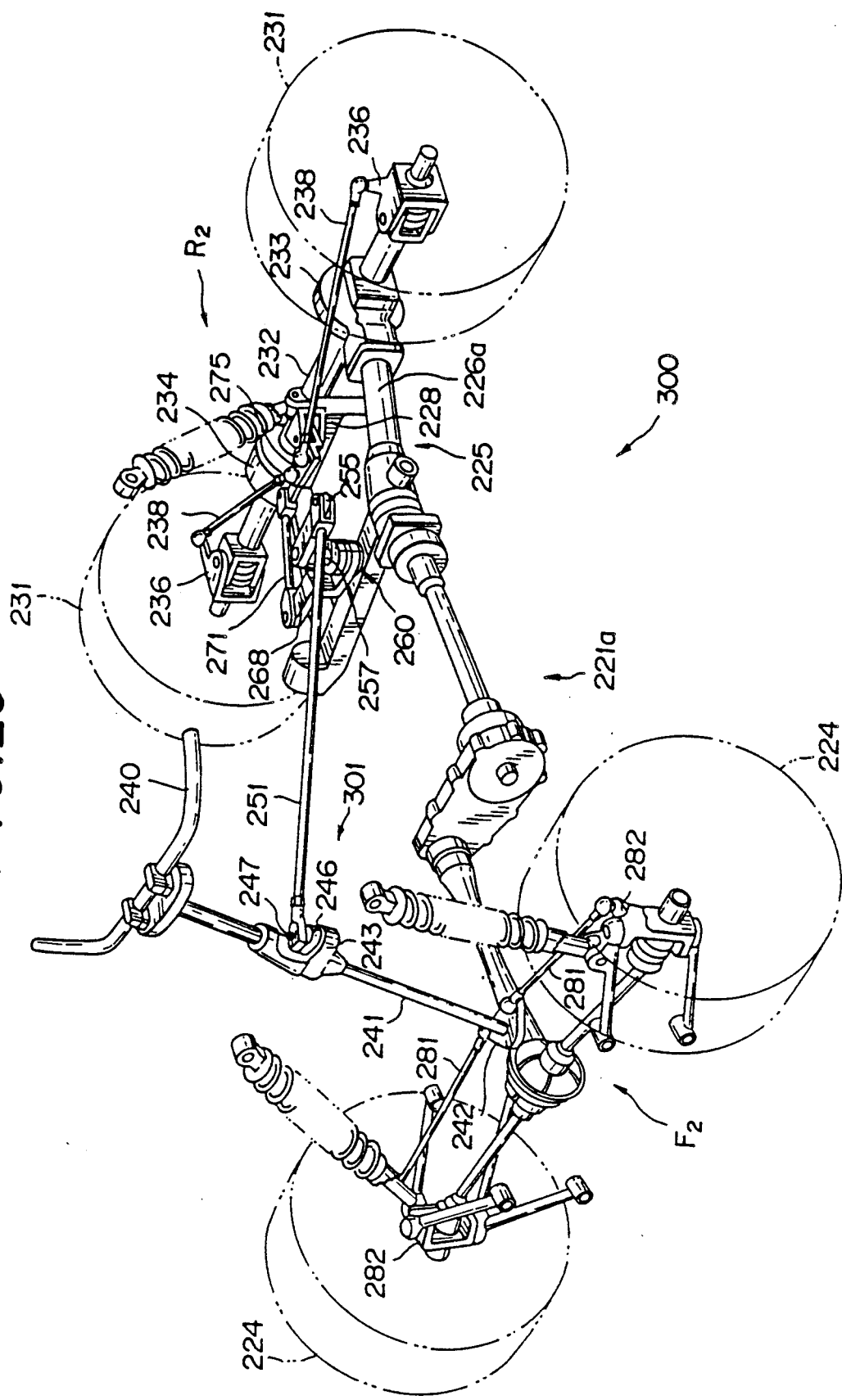
FIG. 20 is a perspective view, as viewed from the front, of the front and rear wheel steering apparatus of the second embodiment, the view also showing a wheel drive system and wheel suspensions.

A steering shaft 241 with a handlebar 240 attached to the upper end thereof is angularly movably inserted through the head pipe 202. As shown in FIG. 11, the vehicle frame 201 includes front pipes 203, 204 between which connector pipes 205 extend, with a plate 206 joined to and extending between the pipes 205. The steering shaft 241 has a lower portion rotatably inserted in a holder 207 mounted on the plate 206. A front wheel steering arm 242 is fixed to the lower end of the steering shaft 241 which projects downwardly beyond the holder 207. As shown in FIGS. 20 and 21, the steering arm 242 extends rearwardly from the lower end of the steering shaft 241. The inner ends of tie rods 281 for steering the front wheels are pivotally coupled to the upper surface of the rearwardly extending portion of the steering arm 242 at laterally spaced symmetric positions thereon through ball-and-socket joints 242a. The tie rods 281 have outer ends pivotally coupled to knuckle arms 282 of the front wheels 224 through respective ball-and-socket joints (not shown). The components 241, 242, 281, 282 ranging from the steering shaft 241 to the knuckle arms 282 jointly constitute a front wheel steering mechanism F2.

In FIGS. 10 through 12, 14 through 17, and 20 through 22 which will be described below, various parts are shown as being in conditions and/or positions when the handlebar 240 is in its neutral position.

The steering shaft 241 has an intermediate portion extending coaxially through an axial opening in a stationary sun gear 248. The steering shaft 241 also extends through a central opening 209a defined in an upper surface 209 of a gusset 208 joined to and extending between the pipes 204 on the front portion of the vehicle frame 201, as shown in FIGS. 10 and 13. The sun gear 248 has a lower flange 249 fixed to the upper surface 209 of the gusset 208. A needle bearing is disposed between the outer periphery of the steering shaft 241 and the inner peripheral surface of the axial opening of the sun gear 248 for allowing smooth relative angular movement between the steering shaft 241 and the sun gear 248. As shown in FIGS. 11, 12, 22, and 23, a housing holder 243 serving as a steering bridge is fitted through splines over the steering shaft 241 at a position slightly above the sun gear 248. The holder 243 covers the sun gear 248 and includes a lateral portion projecting leftwardly of the steering shaft 241 and accommodating a shaft 244 parallel to the axis of the steering shaft 241 and the axis of the sun gear 248. A planet gear 245 is rotatably fitted over the shaft 244 in mesh with the sun gear 248. The planet gear 245 includes an integral arm 246 on its upper portion, the arm 246 having an integral shaft 247 which is eccentrically displaced from the axis of the gear 245 by a distance (244–247). The stationary sun gear 248, the housing 243, the planet gear 245, the arm 246, and the eccentric shaft 247 jointly constitute a planetary-gear steering angle generating mechanism 301 for the rear wheels The steering angle generating mechanism 301 is disposed slightly above the intermediate portion of the steering shaft 241, with the planet gear 245 and the sun gear 248 being covered with the housing holder 243.

An elongate relay rod 251 for steering the rear wheels is angularly movably connected at a front end thereof to the eccentric shaft 247 of the rear wheel steering angle generating mechanism 301. The relay rod 251 is disposed below and extends rearwardly along an upper larger-diameter main pipe 210 and a larger-diameter seat pipe 220 of the vehicle frame 201. The front end of the relay rod 251 has a length adjusting portion 252 which is angularly movably coupled to the eccentric shaft 247 through a ball-and-socket joint 253 to be angularly movable about the shaft 247.

As illustrated in FIGS. 14 through 17, the relay rod 251 has a bifurcated rear end 254 having upper and lower branches through which a pivot shaft 256 extends. The left-hand end of an input lever 255 is angularly movably mounted on the pivot shaft 256. The input lever 255 has an inner end splined to an upper central pivot shaft 257 which is attached to the vehicle frame for angular movement about its own axis but is axially immovable. A lower central pivot shaft 258 which is angularly movable about its own axis, but axially immovable, is attached to the swing arm 225. The lower end of the upper central pivot shaft 257 and the upper end of the lower central pivot shaft 258 are coaxially coupled to each other by means of a constant-velocity joint 260. Therefore, rotation of the upper central pivot shaft 257 is transmitted to the lower central pivot shaft 258 at a constant speed regardless of divergence or misalignment between the axes of the pivot shafts 257, 258 due to vertical swinging movement of the swing arm 225 with respect to the vehicle frame. As better shown in FIGS. 16 and 17, the center Q of angular movement of the constant-velocity joint 260, which is the center of relative angular movement between the upper central pivot shaft 257 and the lower central pivot shaft 258, is positioned on a swing axis Ps about which the swing arm 225 is swingable with respect to the vehicle frame.

More specifically, as also shown in FIGS. 10 and 18, a U-shaped pipe 216 is coupled to front and rear pipes 215, 215 extending between and joined to laterally spaced down pipes 212, 214 in the rear portion of the vehicle frame 201, and a frustoconical plate 217 and a disc plate 218 are joined to the upper and lower surfaces, respectively, of the pipe 216. A pipe 219 extends through the plates 217, 218, and the upper central pivot shaft 257 is inserted and supported in the pipe 219 for angular movement about its own axis but against axial movement. The swing arm 225 is vertically swingably mounted on pivot shafts 230 installed on respective brackets 213 coupled to the joints between the pipes 211, 212 of the vehicle frame 201. The pivot shafts 230 are directed inwardly in mutually coaxial relationship, and the swing arm 225 has a left-hand larger-diameter arm 226a and a right-hand smaller-diameter arm 226b which have front ends with the outer sides thereof mounted on the pivot shafts 230 by means of bearings.

A front cross member 227 is disposed between and joined to the front ends of the arms 226a, 226b of the swing arm 225. The lower central pivot shaft 258 is axially immovably attached to an intermediate portion of the front cross member 227, the lower central pivot shaft 258 being angularly movable about its own axis.

The constant-velocity joint 260 comprises an inner ring 261 to which the lower end of the upper central shaft 257 is splined and which has a plurality of grooves 262 defined in the outer peripheral surface thereof, an outer ring 263 integrally formed with the upper end of the lower central pivot shaft 258 and having a plurality of grooves 264 defined in the inner peripheral surface thereof, a plurality of balls 265 riding in one of the grooves 262 and a corresponding one of the grooves 264, and a retainer or ball cage 266 interposed between the inner ring 261 and the outer ring 263. The upper surface of the constant-velocity joint 260 is covered with and protected by a dust boot 267 extending between and joined to the pivot shafts 257, 258. The dust boot 267 is omitted from illustration in FIG. 15 for brevity.

Figure 16:
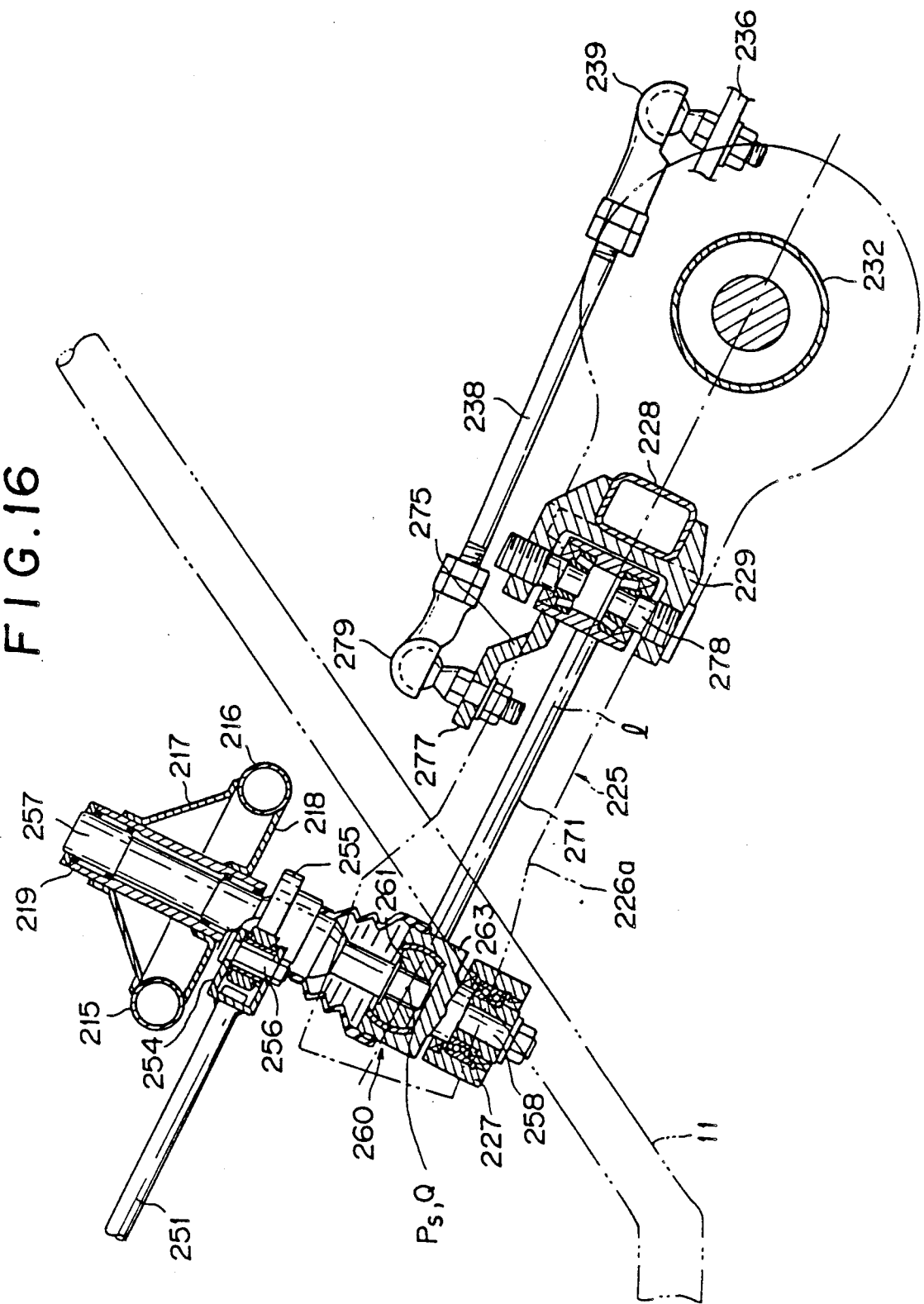
FIG. 16 is a sectional side elevational view of the rear wheel steering mechanism shown in FIGS. 14 and 15.
Figure 17:
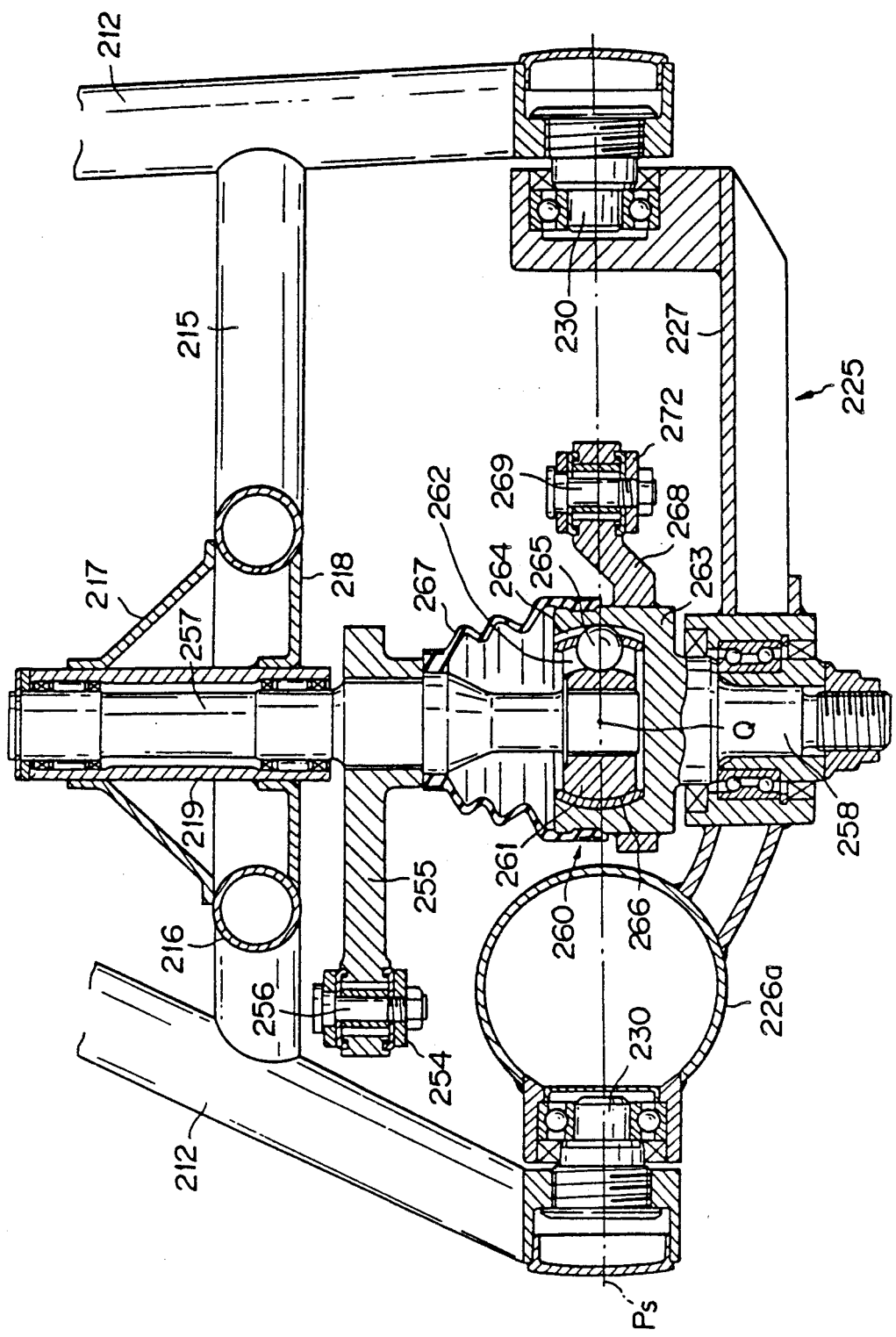
FIG. 17 is a vertical cross-sectional view, as viewed from behind, of a constant-velocity joint in the rear wheel steering mechanism.
Figure 22:
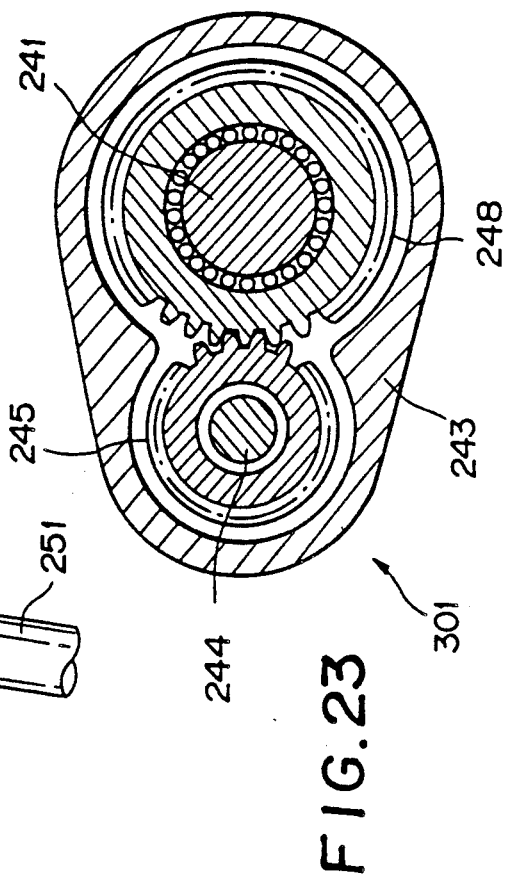
FIG. 22 is a cross-sectional view taken along line XXII—XXII of FIG. 12.
Figure 23:
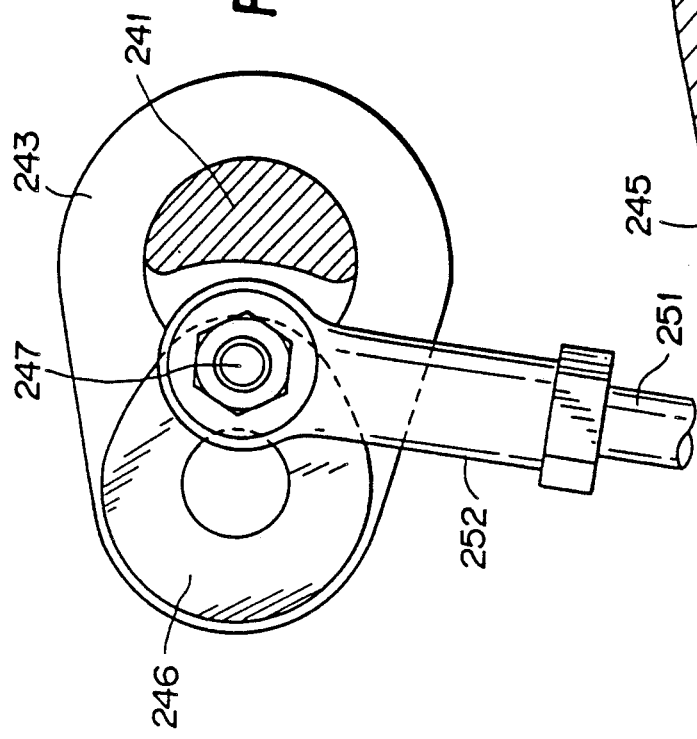
FIG. 23 is a cross-sectional view taken along line XXIII—XXIII of FIG. 12.

An output lever 268 extending in the opposite direction to the input lever 255, i.e., to the right of the vehicle, has an inner end fitted over and welded to the outer ring 263 of the constant-velocity joint 260. To the right-hand end of the output lever 268, there is coupled a support shaft 269 which is laterally swingable and extends vertically between two branches of a front bifurcated portion 272 of a second relay rod 271. As shown in FIG. 16, the second relay rod 271 has an axis aligned, in side elevation, with the axis l of the left-hand larger-diameter arm 226a of the swing arm 225. A crank arm or rear wheel steering arm 275 for steering the rear wheels is disposed substantially centrally in the swing arm 225 in its longitudinal direction. The second relay rod 271 also has a rear bifurcated end 273 including upper and lower branches between which a shaft 274 pivotally coupled to a rear wheel steering arm 275 extends vertically.

As shown in FIGS. 14 through 16, 20, and 21, a rear cross member 228 is joined to and extends between a rear portion of the right-hand arm 226b of the swing arm 225 and an intermediate portion of the left-hand arm 226a of the swing arm 225. A bifurcated bracket 229 projects forwardly from a substantially intermediate portion of the rear cross member 228. The steering arm 275 has a vertex laterally swingably coupled to the bracket 229 by means of a support shaft 278. The shaft 274 to which the rear end of the second relay rod 271 is pivotally coupled is vertically disposed on a rear lever 276 of the steering arm 275. The steering arm 275 includes a front lever 277 to which there are pivotally coupled the inner ends of rear wheel tie rods 238 through respective ball-and-socket joints 279 at laterally symmetric positions thereon.

The arms 226a, 226b of the swing arm 225 are attached at their rear ends to a differential housing 233 and a brake housing 234, respectively, through which a rear axle tube 232 extends transversely of the motor vehicle. A propeller shaft (not shown) rotatable by the engine 221 extends through the arm 226a. A drive shaft (not shown) extends through the rear axle tube 232 and has opposite outer ends which are operatively coupled to the inner ends of rear axles 235 for the rear wheels 231 through universal joints, respectively. The rear axles 235 are rotatably but axially immovably supported on respective knuckle arms 236 that are angularly movably attached to the opposite ends of the tube 232 through pivot shafts 236. The rear wheel tie rods 238 have rear ends pivotally coupled to rear projecting ends of the knuckle arms 236, respectively, by means of balland-socket joints 239. When the swing arm 225 is vertically swung about the pivot axis Ps due to vertical swinging movement of the rear wheels 231, the components 258, 268, 271, 275, 238 coupled to the swing arm 225 are vertically swung in full unison with the swing arm 225 about the swing axis Ps. Therefore, the geometry of the arrangement of components coupled to the swing arm 225 is completely maintained.

The components 241, 301, 251, 255, 257, 260, 258, 268, 271, 275, 238, 236 ranging from the steering shaft 241 to the knuckle arms 236 jointly constitute a rear wheel steering mechanism R2. Since the steering arm 275 for steering the rear wheels 231 is disposed substantially centrally in the swing arm 225 in its longitudinal direction, the second relay rod 271 is made as short as possible.

The front wheel steering mechanism F2 and the rear wheel steering mechanism R2 make up the front and rear wheel steering apparatus 300.

Figure 19:
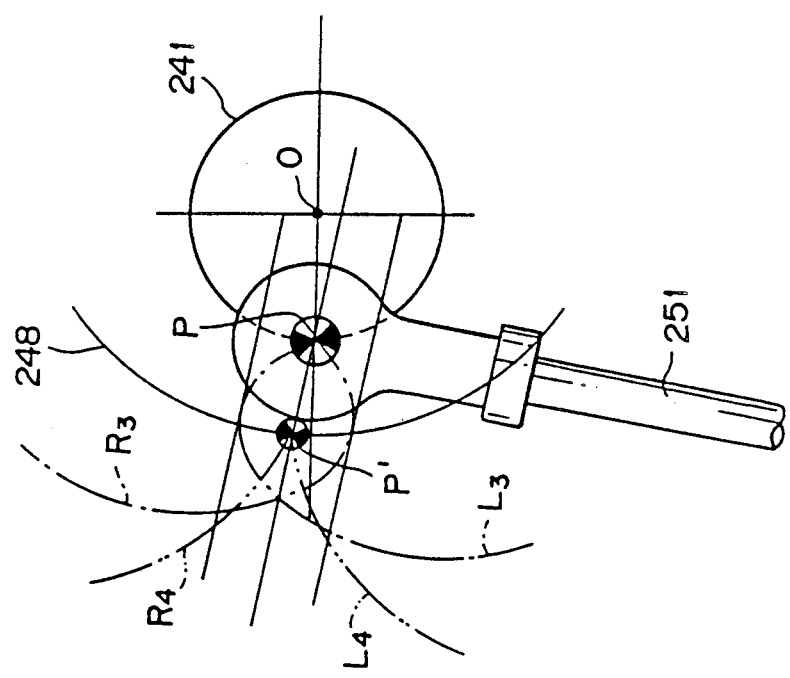
FIG. 19 is a schematic plan view of the planetary gear mechanism illustrated in FIGS. 11 and 12.

Operation of the front and rear wheel steering apparatus 300 will be described also with reference to FIGS. 19 and 24.

The handlebar 240 can be turned through an angle $\theta h$ which has a maximum value $\theta hmax$ that is approximately 50° in each of clockwise and counterclockwise directions.

It is assumed here that the handlebar 240 is turned counterclockwise from the neutral position. The directions in which the various components are rotated or moved are defined when the vehicle is viewed in plan as shown in FIG. 21.

As the handlebar 240 is turned, the front wheels 224 are steered counterclockwise or to the left by the front wheel steering mechanism F2. More specifically, upon turning movement of the steering shaft 241, the steering arm 242 on the lower end thereof is turned counterclockwise about the shaft 241. The turning movement of the steering arm 242 is transmitted via the front tie rods 281 to the front knuckles 282 to steer the front wheels 224 to the left. Since the ball-and-socket joints 242a by which the front tie rods 281 are pivotally coupled to the steering arm 242 are turned around the steering shaft 241, the front steering angle $\theta f$ is increased substantially in proportion to the angle $\theta h$ of turning movement of the handlebar 240 as it increases from 0° through an angle $\theta h1$ (=about 40°) to the maximum angle $\theta hmax$ (=50°). When the handlebar angle $\theta h$ reaches the maximum angle $\theta hmax$, the front wheel steering angle $\theta f$ also reaches its maximum angle $\theta fmax$. Therefore, the front wheel steering angle $\theta f$ varies with respect to the handlebar angle $\theta h$ as indicated by a curve Lf2 in FIG. 24. The maximum front wheel steering angle $\theta fmax$ in FIG. 24 is substantially equal to $\theta fmax$ in FIG. 9. Thus, the maximum front wheel steering angle $\theta fmax$ in FIG. 24 is smaller than the conventional maximum front wheel steering angle $\theta fmax'$ by ($\theta fmax' - \theta fmax$).

As the steering shaft 241 is turned, the holder 243 fixed to the steering shaft 241 is turned counterclockwise in unison with the steering shaft 241. Therefore, the planet gear 245 supported in the holder 243 is caused to revolve around the stationary sun gear 248. Since the planet gear 245 is in mesh with the sun gear 248, the planet gear 245 rotates counterclockwise about the axis of the shaft 244. In response to the counterclockwise rotation of the planet gear 245 about its own axis, the eccentric shaft 247 is also turned counterclockwise about the shaft 244. Thus, the eccentric shaft 247 which serves as the output member of the rear wheel steering angle generating mechanism 301 effects cycloidal movement which is a combination of counterclockwise arcuate movement of the first moving point (the center of the shaft 244) about the stationary point (the center of the shaft 244), the moving point being spaced from the stationary point by a certain distance, and counterclockwise arcuate movement of the second moving point (the center of the eccentric shaft 247) about the moving stationary point (the first moving point), the second moving point being spaced from the moving stationary point by a certain distance. The movement of the eccentric shaft 247 is transmitted via the relay rod 251 and the downstream components 255, 257, 260, 268, 271, 275, 238 associated therewith to the rear knuckle arms 136 to steer the rear wheels 231.

Figure 24:
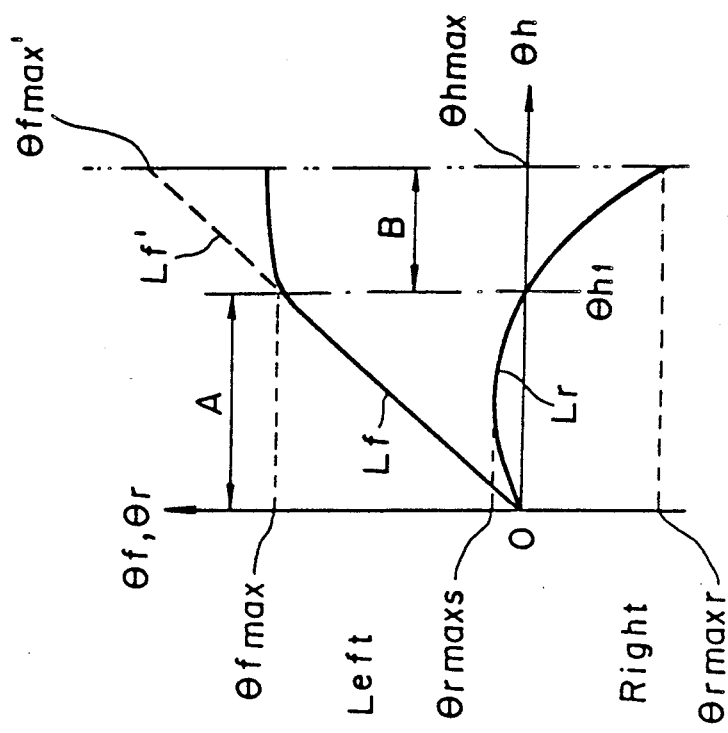
FIG. 24 is a graph showing steering characteristics of the front and rear wheels which are steered by the front and rear wheel steering apparatus of the second embodiment of the present invention.

While the handlebar 240 is turned counterclockwise from the neutral position through the maximum angle $\theta hmax$, the rear wheel steering mechanism R1 including the rear wheel steering angle generating mechanism 301 causes the rear wheel steering angle $\theta r$ to vary as indicated by a characteristic curve Lr2 in FIG. 24. The characteristic curve Lr2 is substantially the same as the characteristic curve Lr in FIG. 9. That is, as the handlebar turning angle $\theta h$ increases from 0° to the angle $\theta h1$, the rear wheel steering angle $\theta r$ progressively increases in the counterclockwise direction to a certain value (= $\theta rmaxs$), and then progressively decreases back to zero. As the handlebar angle $\theta h$ further increases from $\theta h1$ to the maximum value $\theta hmax$, the rear wheel steering angle $\theta r$ progressively increases from 0 in the clockwise direction until finally it reaches the maximum value $\theta rmaxr$. Stated otherwise, the rear wheels 231 are steered to the left or counterclockwise in a relatively small handlebar turning angle range, and are steered to the right or clockwise in a relatively large handlebar turning angle range.

As a result, as shown in FIG. 24, the front and rear wheels 224, 231 are steered in the same direction in a range A and in opposite directions in a range B. In other words the parameters such as dimensions of the components of the front and rear wheel steering mechanisms F2, R2 are appropriately selected to obtain the characteristic curves Lf2, Lr2 and the ranges A, B. The absolute value of the maximum angle $\theta rmaxs$ of the rear wheel steering angle $\theta r$ in the range A is relatively small, whereas the absolute value of the maximum angle $\theta rmaxr$ of the rear wheel steering angle $\theta r$ in the range B is relatively large. When the handlebar 240 is turned clockwise, it is apparent that there are obtained characteristic curves which are in symmetric relationship to the characteristic curves Lf2, Lr2 with respect to the origin of the graph of FIG. 24. Therefore, the steering operation when the handlebar 240 is turned clockwise will not be described.

With the front and rear wheel steering apparatus 300, as with the steering apparatus 110 according to the first embodiment, the steering load required which becomes maximum when the handlebar angle $\theta h$ reaches the maximum value $\theta hmax$ is made smaller than possible with the conventional steering apparatus, and hence the handlebar 240 can be turned more easily. That is, since the radius of a turn of the motor vehicle is small in the range B, an increase in the front wheel steering angle $\theta f$ with respect to the handlebar angle $\theta h$ can be reduced, and as a result the steering load can be lowered.

In the steering apparatus 300, the center P of the eccentric shaft 247 is displaced to the right from the shaft 244 by a suitable distance. More specifically, the center P of the eccentric shaft 247 is initially positioned closer to the center 0 of the steering shaft 241 than the meshing pitch circle between the planet gear 245 and the sun gear 248. Therefore, as shown in FIG. 19, the center P of the eccentric shaft 247 follows a path L3 indicated by the dot- and-dash line when the handlebar 240 is turned to the left or counterclockwise. When the handlebar 240 is turned to the right or clockwise, the center P of the eccentric shaft 247 follows a path R3.

Inasmuch as the holder 243 is turned counterclockwise when the handlebar 240 is turned to the left, the shaft 244 is always moved rearwardly of the neutral position. Thus, if the center P of the eccentric shaft 247 is arranged in alignment with the center of the shaft 244, the eccentric shaft 247 is moved rearwardly of the neutral position, with the result that the rear wheels 231 are steered to the right or clockwise at all times. Consequently, the rear wheel steering characteristics can be varied by changing the initial offset distance between the center P of the eccentric shaft 247 and the center of the shaft 244 in the transverse direction of the motor vehicle. For example, if the center P of the eccentric shaft 247 is initially positioned on the meshing pitch circle (a position represented by P' in FIG. 19) between the planet gear 245 and the sun gear 248, then upon turning the handlebar 240 to the left, the center P of the eccentric shaft 247 follows a path Lr indicated by the two-dot-and-dash line in FIG. 19. Conversely when the handlebar 240 is turned to the right, the center P follows a path L4. As a result, the rear wheels 231 are steered in the opposite direction to the front wheels 224 at all times.

In the front wheel steering mechanism F of the steering apparatus 300, the front wheel steering angle is generated by the steering arm 242 directly coupled to the lower end of the steering shaft 241. Therefore, no special front wheel steering angle generating gear mechanism is necessary. As a result, the front wheel steering mechanism F2 is compact as a whole, and can be designed with greater freedom. The rear wheel steering angle mechanism 301 has the stationary sun gear 248 disposed concentrically with the steering shaft 241, and the planet gear 245 revolving around the steering shaft 241 and meshing with the sun gear 248. The eccentric shaft 247 as the output member of the generating mechanism 301 is rotatable in unison with the planet gear 245 which rotates about its own axis. Therefore, the rear wheel steering angle generating mechanism 301 is constructed of a minimum number of simple components, and can generate a rear wheel steering angle directly and accurately in response to the front wheel steering operation. Consequently, the steering apparatus 300 is of a simpler construction.

In the rear wheel steering mechanism R2 in the front and rear wheel steering apparatus 300, the components coupled to the vehicle frame 201 and the components coupled to the swing arm 225 are coupled to each other by the constant-velocity joint 260 with its center Q of angular movement being positioned on the swing axis Ps about which the swing arm 225 is swingable with respect to the vehicle frame. Therefore, even if the swing arm 225 vertically swings about the swing axis Ps in response to vertical swinging movement of the rear wheels 231, the center Q of angular movement of the constant-velocity joint 225 remains on the swing axis Ps at all times. As a consequence, any effect which the vertical swinging movement of the rear wheels 231 has on the steering characteristics Lr2 of the rear wheels 231 as shown in FIG. 24 is substantially completely eliminated.

In the front and rear wheel steering apparatus 300, furthermore, the elongate relay rod 251, interconnecting the steering shaft 241 and the upper central pivot shaft 257 in the rear portion of the vehicle frame, is disposed below and extends substantially parallel to the larger-diameter main pipe 210 and the larger-diameter seat pipe 220 in the upper portion of the vehicle frame 201, with the down pipes 212 of relatively larger diameter being joined to the larger-diameter seat pipe 220. Thus, the vehicle frame portion constructed of these pipes 210, 220, 212 has a high degree of rigidity and is resistant to twisting. Therefore, the relay rod 257 is prevented from being twisted or flexed. As a result, the output from the rear wheel steering angle generating mechanism 310 at the time the handlebar 240 is turned is transmitted to the upper central pivot shaft 257 highly efficiently for steering the rear wheels 231 exactly through a desired angle.

While the present invention has been described as being applied to the front and rear wheel steering apparatus for a straddle-type four-wheel motor vehicle in each of the above two embodiments, the principles of the present invention are also applicable to a front and rear wheel steering apparatus for a straddle-type tricycle having a single front wheel and two rear wheels, or an ordinary four-wheel passenger motor vehicle. Moreover, the feature that the junction between the components of the rear wheel steering mechanism which are coupled to the vehicle frame and the components of the rear wheel steering mechanism which are coupled to the swing arm is positioned on the swing axis of the swing arm may be incorporated in a front wheel steering mechanism for a motor vehicle having a front swing arm.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. In a front and rear wheel steering apparatus in an off-road motor vehicle having a vehicle frame, at least one front wheel and rear wheels rotatably supported on said vehicle frame, a steering handle operatively mounted on said vehicle frame, a straddle-type seat mounted on said vehicle frame, a rear swing arm vertically swingably mounted on said vehicle frame and supporting said rear wheels; a front wheel steering mechanism operatively interconnecting said steering handle and said front wheel for transmitting turning movement of said steering handle to said front wheel; and a rear wheel steering mechanism operatively interconnecting said steering handle and said rear wheels for transmitting turning movement of said steering handle to said rear wheels, the improvement wherein:

said front wheel steering mechanism comprises a front wheel steering angle generating mechanism responsive to turning movement in one direction of said steering handle from a neutral position through a prescribed angle to a maximum angle for generating a front wheel steering angle which increases from zero to a maximum value in said one direction as an angle of turning movement of said steering handle increases;

said rear wheel steering mechanism comprises a rear wheel steering angle generating mechanism responsive to turning movement in said one direction of said steering handle from said neutral position to said prescribed angle for generating a rear wheel steering angle in said one direction, and also responsive to turning movement of said steering handle from said prescribed angle to said maximum angle for generating a rear wheel steering angle in a direction opposite to said one direction; and at least a portion of said rear wheel steering mechanism is coupled to said rear swing arm.

2. In a front and rear wheel steering apparatus in a motor vehicle having a vehicle frame, at least one front wheel and rear wheels rotatably supported on said vehicle frame, a steering handle operatively mounted on said vehicle frame, a saddle-type seat mounted on said vehicle frame, a view swing arm vertically swingably mounted on said vehicle frame and supporting said rear wheels; a front wheel steering mechanism operatively interconnecting said steering handle and said front wheel for transmitting movement of said steering handle to said front wheel; and a rear wheel steering mechanism operatively interconnecting said steering handle and said rear wheels for transmitting turning movement of said steering handle to said rear wheels, the improvement wherein:

said front wheel steering mechanism comprises a front wheel steering single generating mechanism responsive to turning movement in one direction of said steering handle from a neutral position through a prescribed angle to a maximum angle for generating a front wheel steering angle which increases from zero to a maximum value in said one direction as an angle of turning movement of said steering handle increases:

said rear wheel steering mechanism comprises a rear wheel steering angle generating mechanism responsive to turning movement in said one direction of said steering handle from said neutral position to said prescribed angle for generating a rear wheel steering angle in said one direction, and also responsive to turning movement of said steering handle from said prescribed angle to said maximum angle for generating a rear wheel steering angle in a direction opposite to said one direction; and said front wheel steering angle generating mechanism includes means responsive to turning movement in said one direction of said steering handle from said neutral position to said prescribed angle for generating said front wheel steering angle which increases from zero to said maximum value in said one direction as the angle of turning movement of said steering handle increases, and also responsive to turning movement of said steering handle from said prescribed angle to said maximum angle for continuously generating said maximum front wheel steering angle value at a substantially constant level.

3. A front and rear wheel steering apparatus according to claim 1, wherein said rear wheel steering angle generating mechanism comprises means responsive to turning movement in said one direction of said steering handle from said neutral position to said prescribed angle for generating in said one direction said rear wheel steering angle which first progressively increases from zero to a prescribed value and thereafter progressively decreases to zero, and also responsive to turning movement of said steering handle from said prescribed angle to said maximum angle for generating in said direction opposite to said one direction said rear wheel steering angle which increases from zero to a maximum value.

4. In a front and rear wheel steering apparatus in a motor vehicle having a vehicle frame, at least one front wheel and rear wheels rotatably supported on said vehicle frame, a steering handle operatively mounted on said vehicle frame, a saddle-type seat mounted on said vehicle frame, a rear swing arm vertically swingably mounted on said vehicle frame and supporting said rear wheels; a front wheel steering mechanism operatively interconnecting said steering handle and said front wheel for transmitting movement of said steering handle to said front wheel; and a rear wheel steering mechanism operatively interconnecting said steering handle and said rear wheels for transmitting turning movement of said steering handle to said rear wheels, the improvement wherein:

said front wheel steering mechanism comprises a front wheel steering angle generating mechanism responsive to turning movement in one direction of said steering handle from a neutral position through a prescribed angle to a maximum angle for generating a front wheel steering angle which increases from zero to a maximum value in said one direction as an angle of turning movement of said steering handle increases:

said rear wheel steering mechanism comprises a rear wheel steering angle generating mechanism responsive to turning movement in said one direction of said steering handle from said neutral position to said prescribed angle for generating a rear wheel steering angle in said one direction, and also responsive to turning movement of said steering handle from said prescribed angle to said maximum angle for generating a rear wheel steering angle in a direction opposite to said one direction:

said rear wheel steering angle generating mechanism comprises means responsive to turning movement in said one direction of said steering handle from said neutral position to said prescribed angle for generating in said one direction said rear wheel steering which first progressively increases from zero to a prescribed value and thereafter progressively decreases to zero and also responsive to turning movement of said steering handle from said prescribed angle to said maximum angle for generating in said direction opposite to said one direction said rear wheel steering angle which increases from zero to a maximum value; and said prescribed value of said rear wheel steering angle generated in said one direction is smaller than said maximum value thereof generated in said direction opposite to said one direction.

5. In a front and rear wheel steering apparatus in a motor vehicle having a vehicle frame, at least one front wheel and rear wheels rotatably supported on said vehicle frame, a steering handle operatively mounted on said vehicle frame, a saddle-type seat mounted on said vehicle frame, a rear swing arm vertically swingably mounted on said vehicle frame and supporting said rear wheels; a front wheel steering mechanism operatively interconnecting said steering handle and said front wheel for transmitting movement of said steering handle to said front wheel; and a rear wheel steering mechanism operatively interconnecting said steering handle and said rear wheels for transmitting turning movement of said steering handle to said rear wheels, the improvement wherein:

said front wheel steering mechanism comprises a front wheel steering angle generating mechanism responsive to turning movement in one direction of said steering handle from a neutral position through a prescribed angle to a maximum angle for generating a front wheel steering angle which increases from zero to a maximum value in said one direction as an angle of turning movement of said steering handle increases:

said rear wheel steering mechanism comprises a rear wheel steering angle generating mechanism responsive to turning movement in said one direction of said steering handle from said neutral position to said prescribed angle for generating a rear wheel steering angle in said one direction, and also responsive to turning movement of said steering handle from said prescribed angle to said maximum angle for generating a rear wheel steering angle in a direction opposite to said one direction; and said front wheel steering angle generating mechanism comprises a steering shaft operatively coupled to said steering handle, a gear case coupled to said steering shaft, a sun gear fixed to said vehicle frame coaxially with said steering shaft and disposed in said gear case, a first planet gear rotatably supported in said gear case and held in mesh with said sun gear, and a first output member coupled to said first planet gear and extending outwardly from said gear case, said first output member being operatively connected to said front wheel; and wherein said rear wheel steering angle generating mechanism comprises a second planet gear rotatably supported in said gear case and held in mesh with said sun gear, and a second output member coupled to said second planet gear and extending outwardly from said gear case, said second output member being operatively connected to said rear wheels.

6. A front end rear wheel steering apparatus according to claim 5, wherein said first output member of said front wheel steering angle generating mechanism comprises a rotatable shaft of said first planet gear rotatably mounted on said gear case, a first arm mounted on said rotatable shaft outside of said gear case, and a first output shaft mounted on said first arm and eccentrically displaced from an axis of said rotatable shaft of said first planet gear by a first distance, said first output shaft being operatively coupled to said front wheel; and wherein said second output member of said rear wheel steering angle generating mechanism comprises a rotatable shaft of said second planet gear rotatably mounted on said gear case, a second arm mounted on said rotatable shaft of said second planet gear outside of said gear case, and a second output shaft mounted on said second arm and eccentrically displaced from an axis of said rotatable shaft of said second planet gear by a second distance, said first output shaft being operatively coupled to said rear wheels.

7. A front and rear wheel steering apparatus according to claim 1, wherein said front wheel steering angle generating mechanism comprises a steering shaft operatively coupled to said steering handle, and a first arm coupled to said steering shaft and operatively connected to said front wheel, and wherein said rear wheel steering angle generating mechanism comprises said steering shaft, a holder coupled to said steering shaft, a sun gear fixed to said vehicle frame coaxially with said steering shaft and disposed in said holder, a planet gear rotatably supported in said holder and held in mesh with said sun gear, and an output member coupled to said planet gear and extending outwardly from said holder, said output member being operatively connected to said front wheel.

8. A front and rear wheel steering apparatus according to claim 7, wherein said first output member of said rear wheel steering angle generating mechanism comprises a rotatable shaft of said planet gear rotatably mounted on said holder, a second arm mounted on said rotatable shaft outside of said holder, and an output shaft mounted on said second arm and eccentrically displaced from an axis of said rotatable shaft of said planet gear by a first distance, said output shaft being operatively coupled to said rear wheels.

9. A front and rear wheel steering apparatus according to claim 1, wherein said rear wheel steering mechanism comprises a first component group coupled to said vehicle frame and a second component group coupled to said rear swing arm, and wherein said first component group includes a most downstream component and said second component group includes a most upstream component, said most downstream and upstream components being joined to each other at a junction which is initially positioned on a swing axis between said vehicle frame and said rear swing arm.

10. In a front and rear wheel steering apparatus in a motor vehicle having a vehicle frame, at least one front wheel and rear wheels rotatably supported on said vehicle frame, a steering handle operatively mounted on said vehicle frame, a saddle-type seat mounted on said vehicle frame, a rear swing arm vertically swingably mounted on said vehicle frame and supporting said rear wheels; a front wheel steering mechanism operatively interconnecting said steering handle and said front wheel for transmitting movement of said steering handle to said front wheel; and a rear wheel steering mechanism operatively interconnecting said steering handle and said rear wheels for transmitting turning movement of said steering handle to said rear wheels, the improvement wherein:

said front wheel steering mechanism comprises a front wheel steering angle generating mechanism responsive to turning movement in one direction of said steering handle from a neutral position through a prescribed angle to a maximum angle for generating a front wheel steering angle which increases from zero to a maximum value in said one direction as an angle of turning movement of said steering handle increases;

said rear wheel steering mechanism comprises a rear wheel steering angle generating mechanism responsive to turning movement in said one direction of said steering handle from said neutral position to said prescribed angle for generating a rear wheel steering angle in said one direction, and also responsive to turning movement of said steering handle from said prescribed angle to said maximum angle for generating a rear wheel steering angle in a direction opposite to said one direction;

said rear wheel steering mechanism comprises a first component group coupled to said vehicle frame and a second component group coupled to said rear swing arm, and wherein said first component group includes a most downstream component and said second component group includes a most upstream component, said most downstream and upstream components being joined to each other at a junction which is initially positioned on a swing axis between said vehicle frame and said rear swing arm; and said most upstream component of said second component group of said rear wheel steering mechanism comprises a link rod coupled to said rear swing arm and extending longitudinally of said vehicle frame, said link rod having a rear end operatively coupled to tie rods of said rear wheels and a front end connected to said most downstream component of said first component group.

11. A front and rear wheel steering apparatus according to claim 1, wherein said rear wheel steering mechanism comprises a first component group coupled to said vehicle frame and including a most downstream component, a second component group coupled to said rear swing arm and including a most upstream component, and a constant-velocity joint disposed between and interconnecting said most downstream and upstream components; wherein said most downstream component of said first component group comprises a shaft member angularly movably mounted on said vehicle frame and operatively coupled to said steering handle for being rotated in response to turning movement of said steering handle, and said most upstream component of said second component group comprises a shaft member angularly movably mounted on said rear swing arm and operatively coupled to said rear wheels; and wherein said constant-velocity joint has a center of angular movement which is positioned on a swing axis between said vehicle frame and said rear swing arm so that said center of angular movement of said constant-velocity joint will remain on said swing axis at all times even when said rear swing arm is vertically swung about said swing axis upon vertical swinging movement of said rear wheels.

12. A front and rear wheel steering apparatus according to claim 1, wherein said front and rear wheels have respective balloon type low pressure tires.

13. In a front and rear wheel steering apparatus in a motor vehicle having a vehicle frame, at least one front wheel and rear wheels rotatably supported on said vehicle frame, a steering handle operatively mounted on said vehicle frame; a front wheel steering mechanism operatively interconnecting said steering handle and said front wheel for transmitting turning movement of said steering handle to said front wheel, said front wheel steering mechanism having at least one component movable in proportion to turning movement of said steering handle; and a rear wheel steering mechanism interconnecting said at least one component of said front wheel steering mechanism and said rear wheels for steering said rear wheels in response to steering movement of said front wheel, the improvement wherein:

said front wheel steering mechanism comprises a front wheel steering angle generating mechanism responsive to turning movement in one direction of said steering handle from a neutral position to a prescribed angle for generating a front wheel steering angle which increases from zero to a maximum value in said one direction as an angle of turning movement of said steering handle increases, and also responsive to turning movement of said steering handle from said prescribed angle to a maximum angle for continuously generating said maximum front wheel steering angle value at a substantially constant level; and said rear wheel steering mechanism comprises a rear wheel steering angle generating mechanism responsive to turning movement in said one direction of said steering handle from said neutral position to said prescribed angle for generating in said one direction a rear wheel steering angle which first progressively increases from zero to a prescribed value and then decreases to zero, and also responsive to turning movement of said steering handle from said prescribed angle to said maximum angle for generating in a direction opposite to said one direction a rear wheel steering angle which increases from zero to a maximum value as the angle of turning movement of the steering handle increases.

* * * * *

UNITED STATES PATENT AND TRADEMARK OFFICE
CERTIFICATE OF CORRECTION

PATENT NO. : 4,999,003
DATED : March 12, 1991
INVENTOR(S) : Masaru KOISHI et al.

It is certified that error appears in the above-identified patent and that said Letters Patent is hereby corrected as shown below:

Column 1, line 54, delete "25".

Column 3, line 62, change "suspensions, not shown." to --suspensions (not shown).--.

Column 4, line 55, after "thereof" insert a period.

Column 5, line 2, change "having" to --have--.

Column 8, line 19, delete "range" (first occurrence).

Column 17, line 22 (Claim 2, line 6), change "view" to --rear--;
line 33 (Claim 2, line 17), change "single" to --angle--.

Column 18, line 49 (Claim 4, line 40), after "steering" insert --angle--.

Column 19, line 45 (Claim 6, line 1), change "end" to --and--.

Signed and Sealed this

First Day of September, 1992

Attest:

DOUGLAS B. COMER

*Attesting Officer*   *Acting Commissioner of Patents and Trademarks*